(12) United States Patent
Sobczak et al.

(10) Patent No.: US 9,098,914 B2
(45) Date of Patent: Aug. 4, 2015

(54) ENHANCED ANALYSIS FOR IMAGE-BASED SERPENTINE BELT WEAR EVALUATION

(71) Applicant: GATES CORPORATION, Denver, CO (US)

(72) Inventors: Flloyd M. Sobczak, Erie, CO (US); James H. Sealey, Golden, CO (US); Douglas R. Sedlacek, Centennial, CO (US); Mark E. Stuemky, Westminster, CO (US); Justin Aschenbrenner, Fenton, MO (US); James Christian Bourque, Wheat Ridge, CO (US)

(73) Assignee: Gates Corporation, Denver, CO (US)

( * ) Notice: Subject to any disclaimer, the term of this patent is extended or adjusted under 35 U.S.C. 154(b) by 0 days.

(21) Appl. No.: 14/055,156

(22) Filed: Oct. 16, 2013

(65) Prior Publication Data

US 2014/0254862 A1    Sep. 11, 2014

Related U.S. Application Data

(60) Provisional application No. 61/776,600, filed on Mar. 11, 2013.

(51) Int. Cl.
- *G06K 9/00* (2006.01)
- *G06T 5/00* (2006.01)
- *G06T 7/00* (2006.01)

(52) U.S. Cl.
CPC ............... *G06T 5/009* (2013.01); *G06T 7/0004* (2013.01); *G06T 7/0085* (2013.01); *G06T 2207/30164* (2013.01)

(58) Field of Classification Search
None
See application file for complete search history.

(56) References Cited

U.S. PATENT DOCUMENTS

| | | | |
|---|---|---|---|
| 5,577,774 A | 11/1996 | Morikawa et al. | |
| 5,600,574 A | 2/1997 | Reitan | |
| 5,796,868 A | 8/1998 | Dutta-Choudhury | |
| 6,298,157 B1 * | 10/2001 | Wilensky | 382/199 |
| 6,301,373 B1 | 10/2001 | Bernie et al. | |
| 6,766,208 B2 | 7/2004 | Hsieh | |
| 7,027,082 B2 | 4/2006 | Iida et al. | |
| 7,146,034 B2 | 12/2006 | Reeves et al. | |
| 7,209,832 B2 | 4/2007 | Yamamoto et al. | |
| 7,660,440 B2 | 2/2010 | Bourg, Jr. et al. | |

(Continued)

OTHER PUBLICATIONS

"Belt Drive Preventive Maintenance & Safety Manual" Gates Corporation, Sep. 2008, 67 pages.

(Continued)

*Primary Examiner* — Siamak Harandi
(74) *Attorney, Agent, or Firm* — Jeffrey A. Thurnau, Esq.; Paul N. Dunlap, Esq.

(57) ABSTRACT

Systems and methods are provided for the improvement of an image of a device under test, such as a belt. The image of device under test is made more optimal by determining if the object is rotated away from a preferred axis of the image frame. If so, the image is rotated an opposing angle such that the object is parallel to the preferred axis of the image frame. The rotated image is then made available for analysis of the object. Rib width analysis is performed along the entire length of the detected rib by either de-rotating the image or not.

22 Claims, 19 Drawing Sheets
(4 of 19 Drawing Sheet(s) Filed in Color)

(56) References Cited

U.S. PATENT DOCUMENTS

| | | |
|---|---|---|
| 7,796,807 B2 | 9/2010 | Alumot et al. |
| 7,863,552 B2 | 1/2011 | Cartlidge et al. |
| 7,946,047 B2 | 5/2011 | Smith et al. |
| 2002/0055925 A1 | 5/2002 | Kondo et al. |
| 2003/0168317 A1 | 9/2003 | Fromme et al. |
| 2004/0091135 A1 | 5/2004 | Bourg, Jr. et al. |
| 2007/0145308 A1* | 6/2007 | Kemp .................. 250/559.08 |
| 2007/0260406 A1 | 11/2007 | Johnson et al. |
| 2009/0103781 A1 | 4/2009 | Fleury et al. |
| 2010/0060677 A1 | 3/2010 | Jones et al. |
| 2010/0064495 A1 | 3/2010 | Iizuka et al. |
| 2010/0198387 A1 | 8/2010 | Satonaga et al. |
| 2010/0307221 A1 | 12/2010 | Smith et al. |
| 2011/0050213 A1 | 3/2011 | Furukawa |
| 2011/0081087 A1 | 4/2011 | Moore |
| 2012/0084220 A1 | 4/2012 | Rider et al. |
| 2013/0058560 A1 | 3/2013 | Sobczak et al. |

OTHER PUBLICATIONS

International Search Report and Written Opinion for International (PCT) Patent Application No. PCT/US2012/053818, mailed Jan. 25, 2013, 14 pages.

Official Action for U.S. Appl. No. 13/226,266, mailed Jul. 25, 2013, 6 pages, Restriction Requirement.

Official Action for U.S. Appl. No. 13/226,266, mailed Sep. 9, 2013, 15 pages.

International Search Report and Written Opinion for International (PCT) Patent Application No. PCT/US2014/018560, mailed Jun. 13, 2014, 9 pages.

Internatioanl Preliminary Report on Patentability for International (PCT) Patent Application No. PCT/US2012/053818, mailed Mar. 20, 2014, 13 pages.

Notice of Allowance for U.S. Appl. No. 13/226,266, mailed Feb. 6, 2014.

\* cited by examiner

Belt identified along outer edge

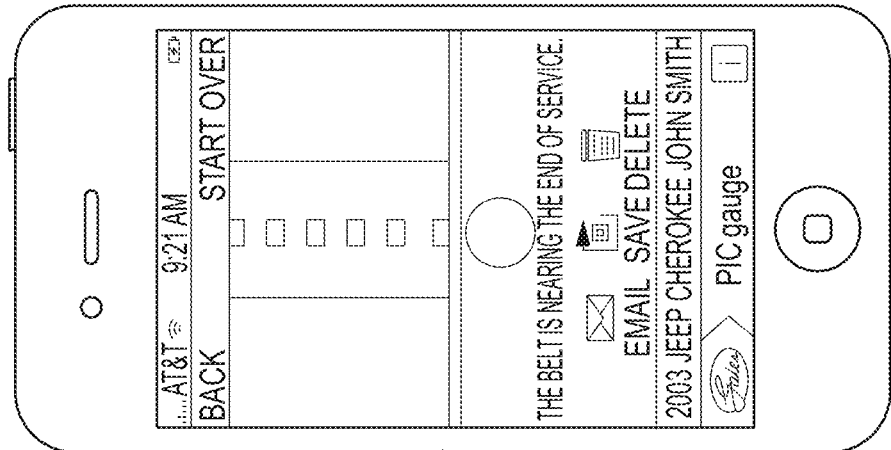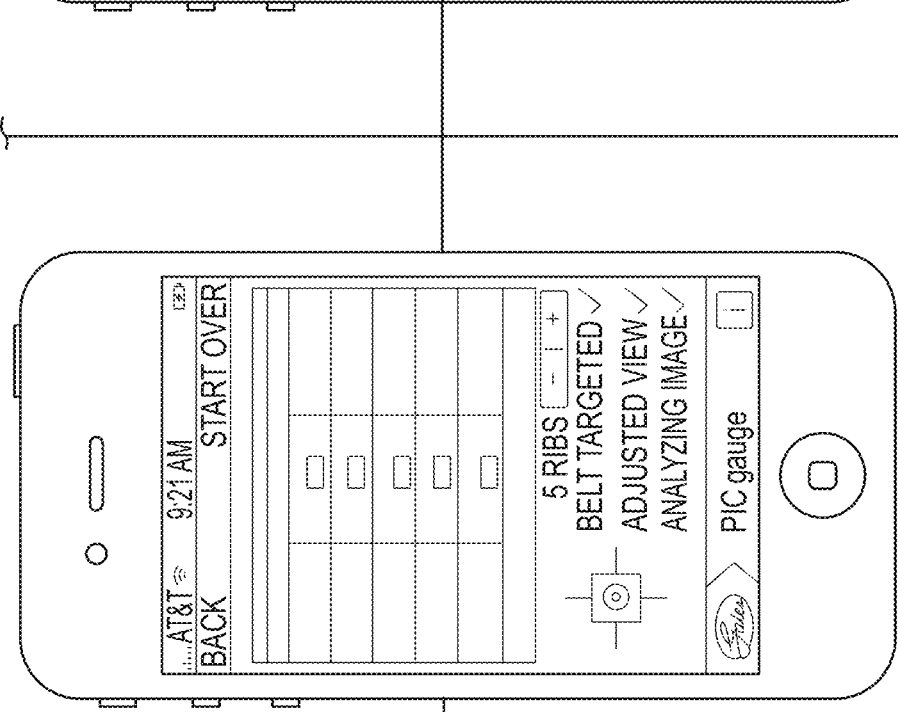
FIG. 16B
FIG. 16A

ENHANCED ANALYSIS FOR IMAGE-BASED SERPENTINE BELT WEAR EVALUATION

CROSS REFERENCE TO RELATED APPLICATIONS

This Application claims the benefit of U.S. Provisional Application No. 61/776,600, filed Mar. 11, 2013, the entire disclosure of which is hereby incorporated herein by reference.

FIELD OF THE DISCLOSURE

The present disclosure is generally directed toward measuring belt wear, and more specifically using images to identify belt wear characteristics and predict belt life.

BACKGROUND

Serpentine drive belts are becoming increasingly durable due to the use of Ethylene Propylene Diene Monomer (EPDM) materials. As a result, a historically reliable indicator of belt wear, cracking, occurs less frequently although belts continue to wear over time. One problem that exists due to the use of these advanced materials is that pre-failure wear detection is increasingly difficult to quantify. In other words, serpentine drive belts made of EPDM materials are commonly only diagnosed as excessively worn after a complete failure of the belt.

Recent advances to deal with the above-identified problem require a physical tool that is contacted with a belt being measured. Examples of such tools are described in U.S. Pat. No. 7,946,047 and U.S. Patent Publication No. 2010/0307221 both to Smith et al., each of which are hereby incorporated herein by reference in their entirety. These solutions rely on physical contact between the measurement tool and the belt being measured.

It would be useful to develop a belt measurement solution that does not rely on physical contact between a tool and the belt being measured, and which can quickly and effectively identify belt wear. Further benefits would be realized if such a system reduced the burden of image processing required of an operator of such a system.

SUMMARY

One technique for non-contact measuring of belt wear is described in applicants' co-pending application, application Ser. No. 13/226,266, filed on Sep. 6, 2011, and entitled, MEASUREMENT OF BELT WEAR THROUGH EDGE DETECTION OF A RASTER IMAGE, which is hereby incorporated herein by reference in its entirety for all that it teaches.

A method for determining the orientation of a serpentine belt depicted in a digital photograph, for the purpose of correcting for rotation prior to analyzing the degree of rib wear. By performing digital filtering manipulations of the photograph's gamma, luminance, contrast, hue, color channels and other information, the software will identify parallel, high aspect-ratio, quadrilateral areas of the digital data which will be deemed to represent the longitudinal axes of the belt ribs. The results of this analysis will be used to define the orientation of the belt image within the photograph's field, and establish the perpendicular axis for use in the subsequent analyses.

Additionally, a method for compensating for uneven lighting in a digital photograph of a serpentine belt, for the purpose of accurately identifying the orientation and/or number of belt ribs, prior to analyzing the degree of rib wear. By performing digital filtering manipulations of the photograph's gamma, luminance, contrast, hue, color channels and other information, the software will normalize the contrast levels in various regions of the photograph to prevent differences in edge sharpness from causing the software to incorrectly interpret the data.

Sequence of Operation:

This invention solves a prior art issue of defining edges of belt and analysis of a skewed or not parallel rib profile for improved user interface by processing image range of pixels (resolution) before start of analysis where this step provides an image size that is consistent for all image imputes from any type of smartphone or focal length of the image capture Step 1 of algorithm: Reduce resolution of image, for example by as much as $1/10^{th}$ and measure the angles of the belt rib, additionally crop the belt edges as defined Step 2 of algorithm: Return to full resolution of the image and define rib edges as described below.

To find the orientation

Mask the belt, crop by removing high contrast areas, additionally analyze the threshold of variations of pixel sizes (neighborhoods) or singularly analyze the thresholds of pixel neighborhoods Using Adaptive Threshold Open CV Library or Other Library with Equivalent Functionality:

Validate proper size of pixel neighborhood to define the number of ribs

Progression of analysis with selection of different pixel areas such as 5, 10, 100 or additional size pixel neighborhoods An example of one process or cycle of analysis to determine if black or white—look in the near neighborhood of 35 pixels for adaptive threshold analysis and analyze for fit within a tolerance to a polygon, preferably a polygon with 4, 5, or 6 vertices Continue cycle of analysis of the range of greys to determine black or white image regions of contours where one image has several contours Process contours through polygon fit—in pixel regions Process an area filter of regions greater than $1/50^{th}$ image area pixels square or a value of similar size to eliminate non-rib spurious regions and additionally a process method to make the polygon error (tolerance) based on the image pixel size.

Belt orientation image is solved by Cartesian coordinates of longest polygon edges from the primary angles of detected polygons The above invention presents a belt profile image that is cropped, rotated and presented to algorithms of prior art: Measurement of Belt Wear Through Edge Detection of a Raster Image Step One Screenshot—image to identify edges of belt [See FIG. 1]

Step Two Screenshot—image of belt ribs [See FIG. 2]

Code sampling of invention

[See FIG. 3]

One method for accomplishing this utilizes a series of manipulations that will sequentially increase the contrast between adjacent areas of low contrast in poorly-lit areas of the photograph until they are similar in contrast to the well-lit areas of the photograph. These manipulations should be able to exploit as little as one data point of difference in one or all of the data channels in the digital photograph by altering variables such as the radius from the target pixel of the area of adjacent data to be used in the analysis, the degree of added contrast applied, and the threshold of difference that will determine whether the transformation will be applied to the data. This process is similar to a process used in digital photography and printing known as un-sharp masking.

Additionally, a method for determining the number of ribs and/or valleys present in the belt depicted in the digital photograph, for the purpose of informing the analysis software, prior to analyzing the degree of rib wear. Utilizing data representing the parallel quadrilateral areas of the photograph, in conjunction with the data representing the marked rib top a comparison will be made to determine whether these two datasets return a consistent value representing the number of ribs contained in the belt represented in the photograph. If these two data sets do not agree, the marks applied by the user will be used to determine the number of ribs on the belt. Collection and analysis of these two data sets will provide a method for determining the accuracy of the methodology, and to allow further refinements to the software.

Collectively, these improvements will obviate the need for the user to:

1. Orient the photographic capture device in any particular manner
2. Zoom, rotate, center or otherwise manipulate the photo after capture
3. Manually enter the number of belt ribs prior to analysis
4. Eliminate the need to mark the belt The quality of the acquired image of an object under test may be a factor in the ability or accuracy of a non-contact analysis tool to analyze an object under test, such as a belt. Many image defects can be negated in whole or in part. The human eye can be utilized to identify many image defects associated with an image of a belt. However, in accord with the embodiments and claims herein, a machine-based image correction provides a remedy to many belt-image defects and may also improve the speed and accuracy of the image and analysis thereof.

Advantages in non-contact analysis, such as the measurement of belt wear by analysis of a belt image, may be realized by implementing the embodiments described herein. One advantage is realized by providing a belt measurement application, incorporating automatic correction for certain image-capture defects, such as rotation of the belt relative to the image-capture frame of reference. With the belt image rotated or de-rotated, such that the belt image is made to have a particular orientation to a predefined axis of the imaging frame, the speed and accuracy of the analysis is improved over the image. Therefore, in one embodiment, a machine-based rotation of an image of a belt is provided. Additional embodiments illustrate the ability to further improve the image by performing operations such as cropping, edge detection and/or belt rib detection.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "identify", "determine", "calculate", "compute," and variations thereof, as used herein, are used interchangeably and include any type of methodology, process, mathematical operation or technique.

The term "module" as used herein refers to any known or later developed hardware, software, firmware, artificial intelligence, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments are described in conjunction with the appended figures:

FIGS. 16A-16D illustrates a process as presented to a user in accordance with embodiments of the present disclosure.

DETAILED DESCRIPTION

One desired utility of the embodiments described herein are directed towards processing an image of a belt, and more specifically to an image of a portion of a belt, for use by a belt analysis module, application or engine. However, those of ordinary skill in the art will appreciate that, in addition to a belt, other objects under test may benefit from the teachings herein, including, but not limited to, gears, pulleys, idlers, shafts, bearings, blades and support members.

Figure 1:
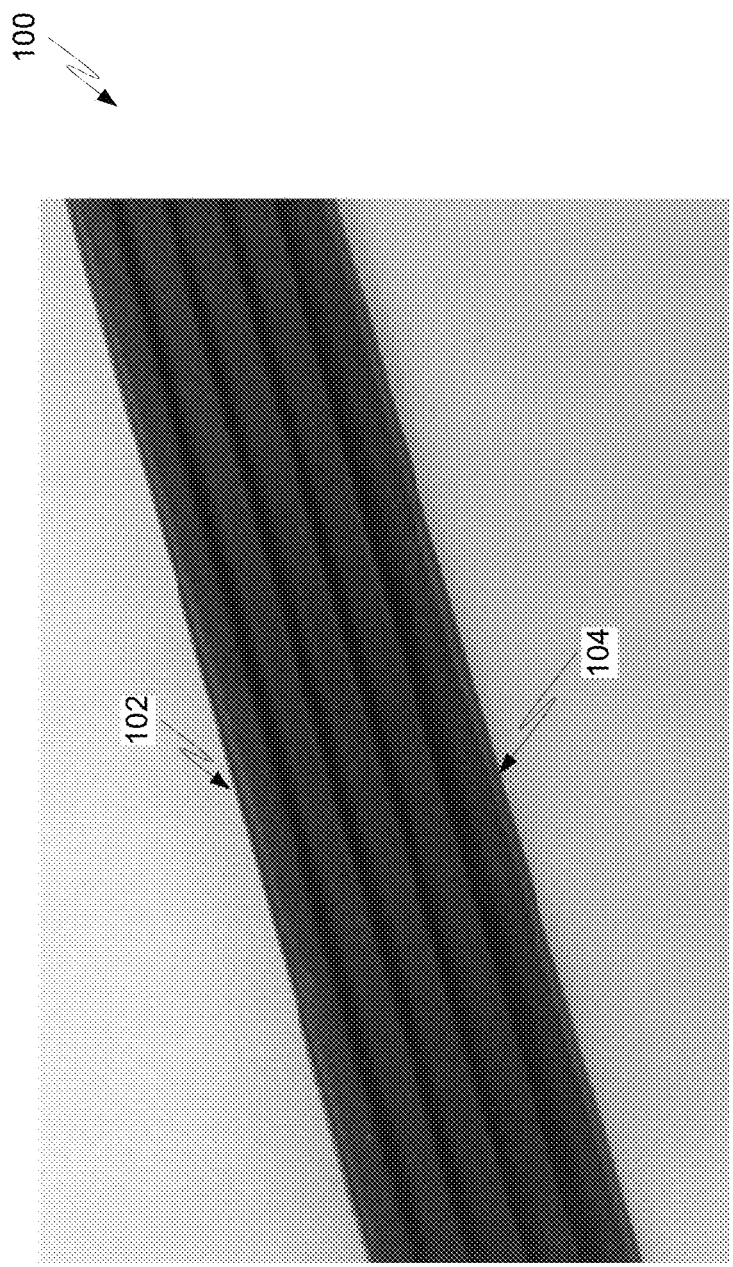
FIG. 1 is a first belt image in accordance with embodiments of the present disclosure.

Referring now to FIG. 1, is a first belt image 100. Outer edges 102 and 104 are identified.

Figure 1B:
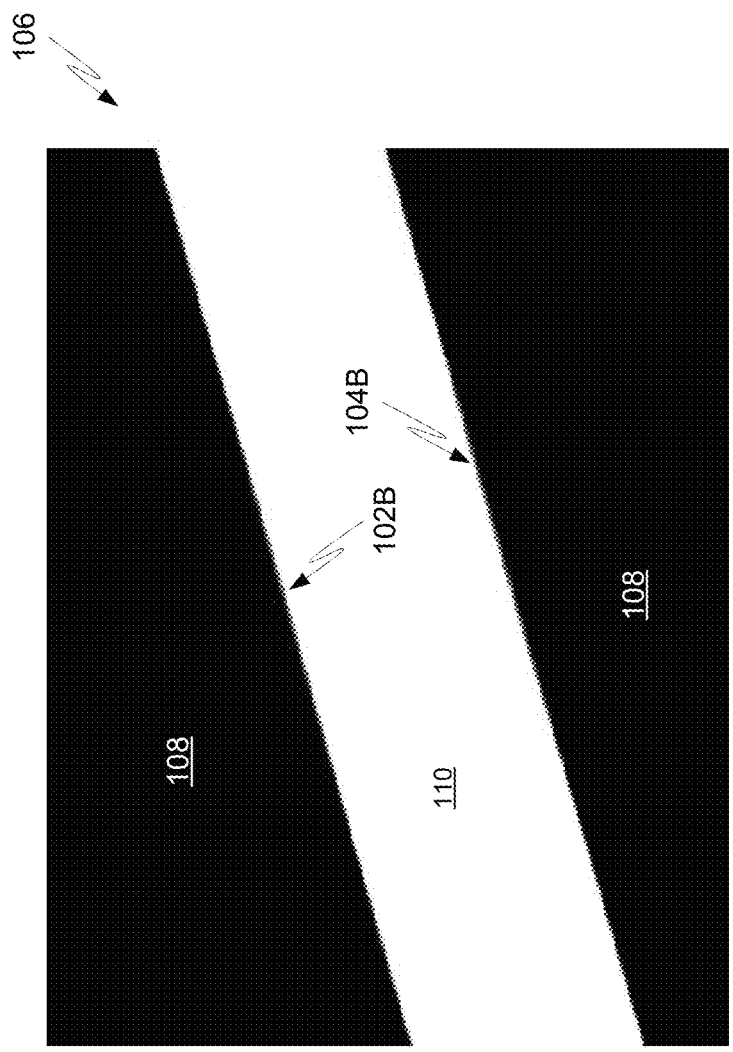
FIG. 1B is a image after adaptive thresholding and full belt detection.

Referencing FIG. 1B is first belt image 100 after adaptive threshold algorithm. FIG. 1B illustrates a second image 206 with binary and reversed values. First and second belt edges 102B and 104B are illustrated and form the border between the belt image 110 and background 108.

Figure 2:
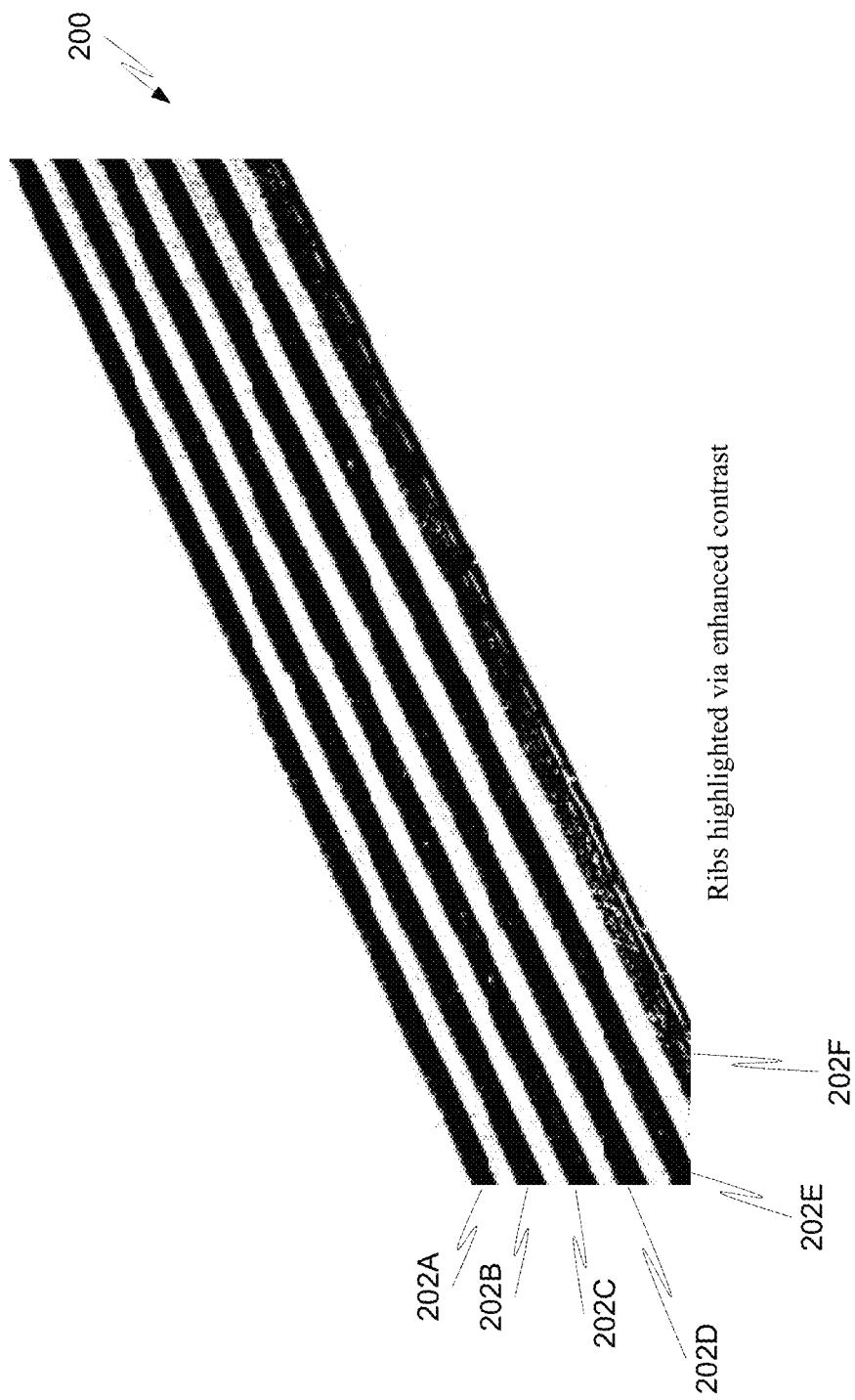
FIG. 2 is an enhanced contrast image of a first belt image in accordance with embodiments of the present disclosure.

FIG. 2 is an enhanced contrast image 200 of first belt image 100. In the embodiment illustrated, 6 ribs (202A-202F) are identified. Further discussion of rib identification follows below. Referring again to the illustrated embodiment, ribs 202A, 202B, 202C, 202D and 202F form dark regions that, within a tolerance, form polygons with 4 vertices. Rib 202E, forms another vertex due to the truncation of image 200, and thus, forms a polygon with 5 vertices. In another embodiment (not illustrated) a rib may form a polygon with 6 vertices, such as when a single rib 200 is imaged from one corner to a diagonally opposite corner and is therefore truncated by four sides of rectangular image, such as image 200.

Figure 3:
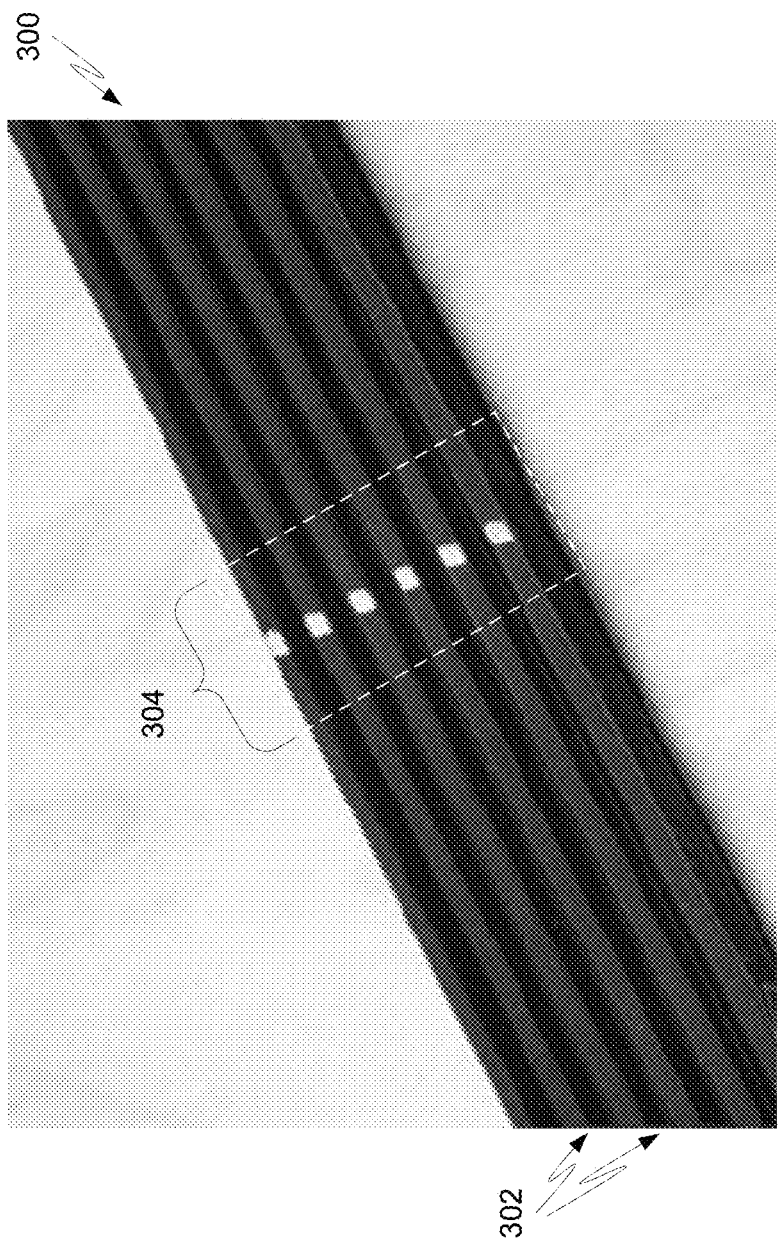
FIG. 3 illustrates identified belt ribs being along the entire axis of the belt in accordance with embodiments of the present disclosure.

FIG. 3 illustrates identified belt 300 with a number of ribs 302 identified (for clarity, not all ribs are identified in the figure). Ribs 302 are identified being along the entire axis of belt 300. In another embodiment, identification of ribs 302 occurs along a portion of the axis, such as an area substantially co-located with marks 304.

Figure 4:
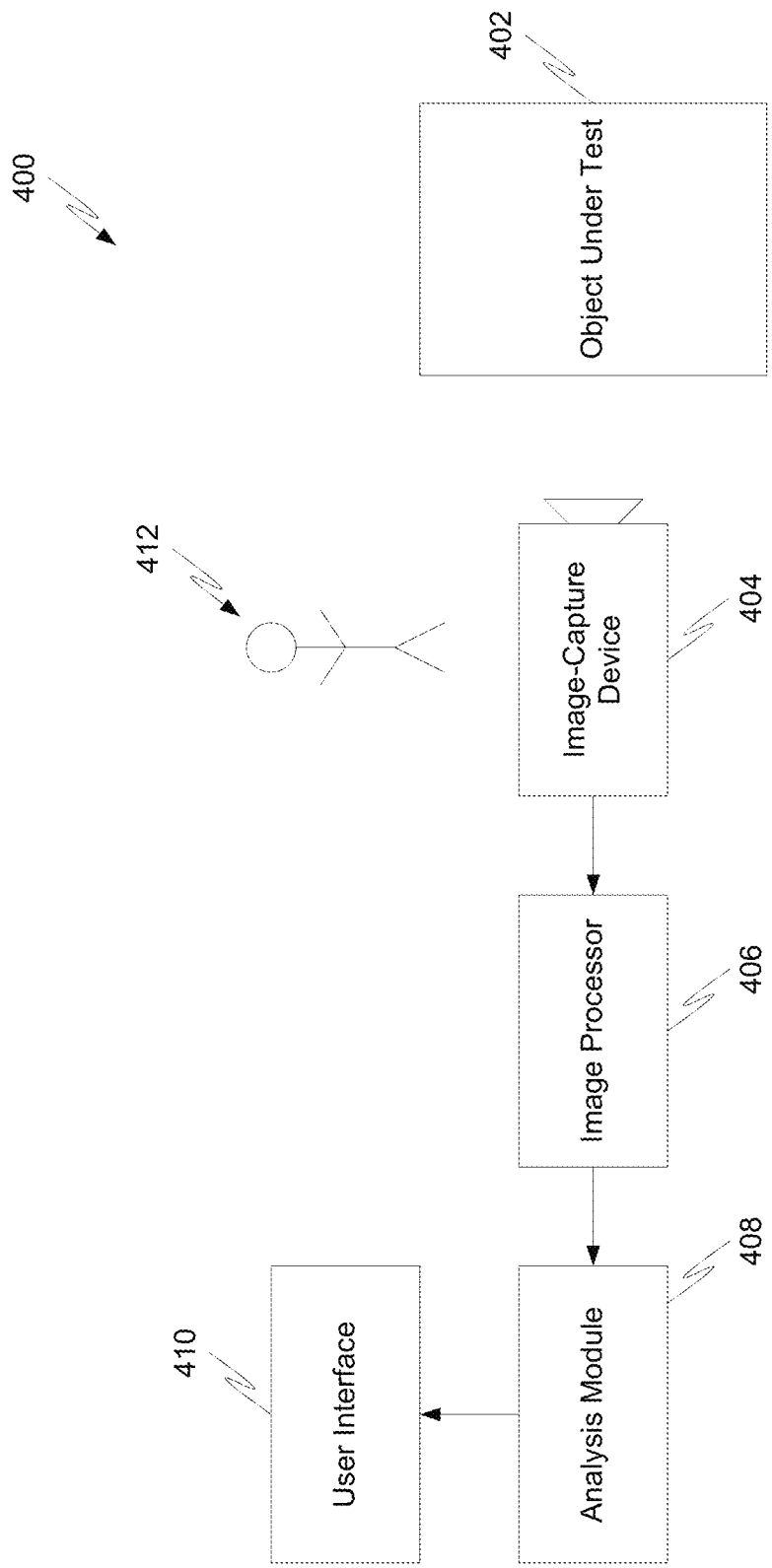
FIG. 4 is a block diagram illustrating a measurement system in accordance with embodiments of the present disclosure.

Referring now to FIG. 4, a measurement system 400 will be described in accordance with embodiments of the present disclosure. The measurement system 400 may comprise one or more components for analyzing an object under test 402 for classifying the object under test 402 as either good (e.g., not requiring a replacement) or bad (e.g., requiring a replacement). Other determinations may be made for the object under test 402 without departing from the scope of the present disclosure; for instance, the object under test 402 may be identified as failing (e.g., soon requiring a replacement) or abnormal (e.g., not following an expected wear pattern and, therefore, requiring further investigation and/or replacement).

In some embodiments, the measurement system 400 comprises an image-capture device 404, an image processor 406, an analysis module 408 and a user interface 410 for use by user 412.

As a non-limiting example, the object under test 402 may comprise a belt, specifically a serpentine belt made of EPDM materials. The belt may either be located in an operational position (e.g., mounted on a vehicle or other device which employs the belt) or it may be in a non-operational position (e.g., removed from a vehicle or other device which employs the belt). The image-capture device 404 may be capable of capturing one or more still images. Alternatively, or in addition, the image-capture device 404 may be capable of capturing video images (e.g., a sequenced number of image frames which may or may not be synchronized with an audio input). The image(s) captured by the image-capture device 404 may comprise color (e.g., a pixel image where each pixel comprises a Red, Green, and Blue (RGB) pixel value), greyscale (e.g., a pixel image where each pixel comprises a greyscale pixel value between 0 and a predetermined number such as 255), black-and-white (e.g., a pixel image where each pixel comprises a binary value corresponding to either a black or white), infrared (e.g., a pixel image where each pixel comprises an infrared pixel value), ultraviolet (e.g., a pixel image where each pixel comprises an ultraviolet value), or any other known type of image. A non-limiting example of the image-capture device 404 is a camera (still or video) that is either a stand-alone device or is incorporated into a user device such as a smart phone.

Image processor 406 determines if any automatic corrections are necessary to improve the accuracy of the image acquired by image-capture device 404 of the object under test 402. Upon determining automatic corrections are to be applied, such corrections are applied by image processor 406. If automatic corrections are not applied, the image is made available to the analysis module 408 without automatic corrections. If automatic corrections are applied, then the image is made available to the analysis module 408 following application of the automatic corrections.

Analysis module 408 then analyzes the image of the object under test 402 and reports the results of the analysis to user 412 via user interface 410.

Image processor 406 may determine that an image is beyond correction, such as may occur with an image that is under or over exposed, and may further notify the user that the image needs to be re-acquired. Notification of an unusable image may be via user interface 410 or another user interface.

In one embodiment, the image processing functionality performed by image processor 406 is performed upon the image being made available by image-capture device 404. An image is made available upon one component providing the image into shared memory, accessible memory, or delivering the image via a communications link or the like. In some embodiments, a signal is sent from one component to a second component to notify the second component of the availability of the image or the termination of processing by the first component.

While the embodiments provided herein are primarily directed towards the acquisition and alteration of a single image, additional images may be created without departing from the scope of the present invention. Embodiments whereby an image is transferred from a first module to a second may be performed by copy operations whereby both the first and second module both maintain a copy of the image. Similarly, embodiments whereby the image is altered may be performed on a copy of the image and the original or preceding image remains unaltered. Furthermore, alterations may be applied to a copy of an image, change file or a logical image layer such that the alterations may be discarded and the original image left in, or returned to, an unaltered state. Processing continues with the application of the alterations to the image or with a copy of the image containing the alterations.

Image capture device 404, image processor 406, analysis module 408 and user interface 410 are illustrated herein as discrete components. Measurement system 400 may be embodied in various other configurations. In one embodiment, every component of the measurement system 400 may be included in a user device such as a cellular phone, smart phone, Personal Computer (PC), laptop, netbook, tablet, or the like or access a common user interface, such as user interface 410. In such an embodiment, a connectable communication link is provided between components, such as wired, wireless or optical or magnetic removable media interface. In other embodiments at least two of the image capture device 404, image processor 406, analysis module 408 and user interface 410 are co-located within the same form factor or processing device, such as an application specific integrated circuit (ASIC), processing card (e.g., PCI, PCIe), general purpose integrated device or computing platform. It can be appreciated that a communication bus, via, circuit, PCB trace or other communications medium may be employed for communication within physically integrated components.

Figure 5:
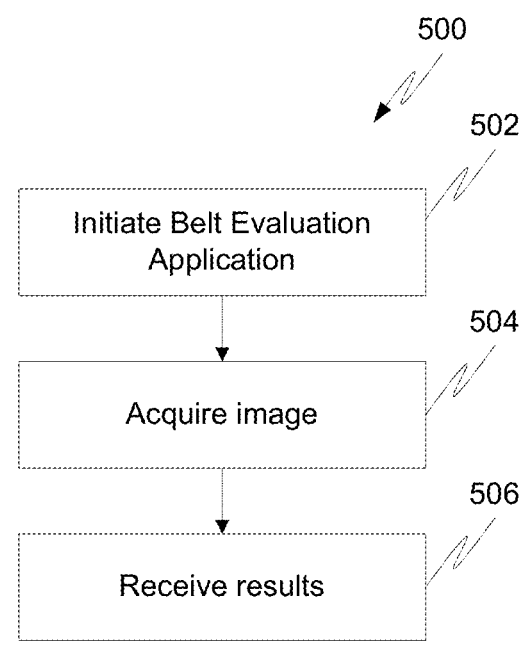
FIG. 5 is a flowchart illustrating a user's experience with the measurement system in accordance with embodiments of the present disclosure.

FIG. 5 is a flowchart 500 illustrating a user's experience with the measurement system, such as measurement system 400, in accordance with embodiments of the present disclosure. User 412 performs step 502 whereby the belt evaluation application is initiated.

In one embodiment, the completion of initiation step 502 automatically initiates (e.g., powers-up or otherwise makes available) the electronic components of system 400 (one or more of user interface 410, analysis module 408, image processor 406, and image-capture device 404). In embodiments whereby certain electronic components of system 400 are not initiated concurrently, or nearly so, with step 502 may be initiated as a precursor to their use. In other embodiments, step 502 resets the application and in yet another embodiment, step 502 is simply accessing the application.

Processing continues with the user being notified, such as by user interface 410, that the application is ready to acquire an image of the object under test 402, such as a belt. The user performs step 504 and acquires the image and is automatically presented with the results in step 506. In other embodiments, one or more additional messages may be presented to the user, such as, error messages, instructions to re-acquire the image by performing step 504 again, informational messages, tutorials, samples, progress bars, options to save and/or print the analysis results or similar information which may improve the user's experience.

While there is no functional requirement to present intermediate steps, such as those performed by image processor 406 and/or analysis module 408, the results or progress of the any intermediate steps may be presented to the user 412 as an option. The option may be selected at the time of development of the application or a configuration choice determined by user 412.

Figure 6:
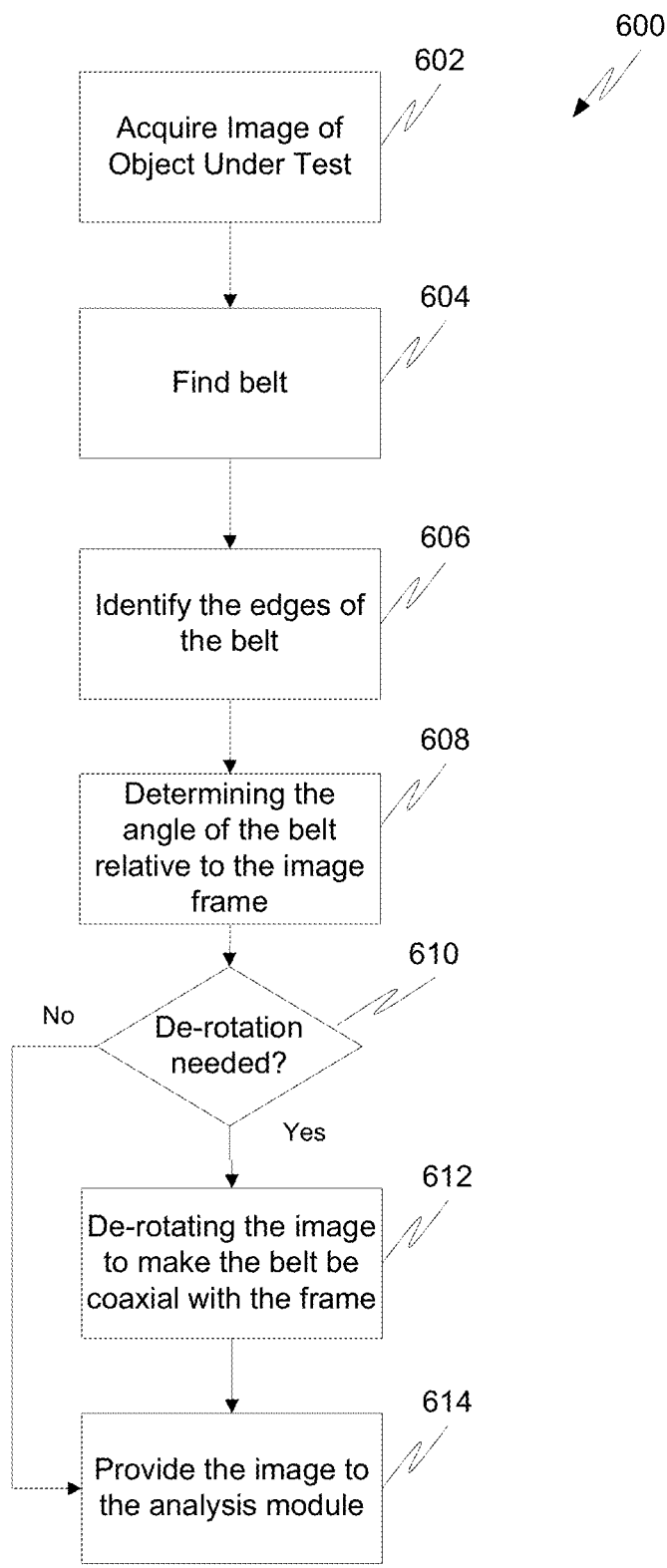
FIG. 6 is a flowchart illustrating one method of processing an image in accordance with embodiments of the present disclosure.

With reference now to FIG. 6 a flowchart 600 illustrating one embodiment of method steps for processing an image is provided. Flowchart 600 may be executed on one or more electronic devices, such as the measurement system of the embodiments of FIG. 4. Step 602 acquires an initial image of the object under test, such as a belt. Step 606 identifies the edges of the belt. Step 604 finds the belt image. Step 608 determines the angle of the belt relative to the frame of the image. Step 610 determines if de-rotation is needed, if yes, processing continues to step 612. If no, processing proceeds to step 614. Step 612 de-rotates the image, whereby the image is rotated or counter rotated as the case may be, the negative value of the angle determined in step 608. Step 614 provides the image to the analysis module for analyzing the belt image. Additional steps, not shown, may include reporting or storing the results of the analysis for use by a user, such as user 412, to review and take appropriate action (e.g., replace a defective belt or schedule a future re-evaluation of the belt).

De-rotation step 612 may include the application of a rotation algorithm to a copy of the image or the original image as acquired in step 602. De-rotation step 612 may embody the generation of de-rotation information (e.g., points, matrix, equation, or code) usable by analysis module 408. In such an embodiment, analysis module 408 would read the original image with the application of the de-rotation information, such that the analysis is provided on the original image as if it had been de-rotated.

In another embodiment, the image is cropped (automatically or manually). Portions of the image that fall outside of the identified edges of the belt image may be considered extraneous and discarded. Imaging certain objects under test, such as a belt, typically excludes the entirety of the belt from any one frame as the belt image runs the length of one axis, such as the preferred axis, and terminates at the two opposite edges of the frame. Embodiments for the analysis of objects under test that do not terminate at the edge of the frame (e.g., a portion of a cut belt) may be cropped or otherwise processed, such that the termination of the object image becomes a frame edge.

Step 606 identifies the edges of the belt in the image. An edge can be embodied as an array of pixels forming a line. However, slight variations of the arrangement of pixels, whereby the pixels form a curve, a number of line segments, or other less than ideal line may still be considered a line if such an irregularity is determined to be within the expected value of belt edge pixels. In other embodiments, step 606 identifies indicia of the position of the belt, which may be an edge, marking, rib or other attribute of the belt operable to indicate the belts rotational position to the frame.

Step 606 may embody additional processing, such as determining a number of candidate edge lines and confirming or denying their position as an edge line. More specifically, if step 606 expects two edges, as would be expected with a belt, but only one line is identified as an edge candidate, the image may be reprocessed and step 606 repeated. Reprocessing may include enhancing or de-enhancing the image and is described in more detail with respect to FIG. 7. Alternatively, a signal may be created to indicate to a user that the image is unusable and re-acquisition step 602 requires repeating.

In the event more than two edge candidates are proved, where the additional candidate edges are likely ribs of the belt, the outermost edges candidates may be identified as the edges without the need for reprocessing of the image. If desired, the image may be reprocessed, such as by increasing of the contrast or increasing the resolution and step 606 repeated with the reprocessed image. A more detailed description of some of the embodiments of step 606 is provided with respect to FIG. 7.

Once the edges have been identified, step 608 determines the angle of at least one edge to the image frame. The edges, as identified in step 606, may form an angle with the preferred axis of the frame of the image. Various embodiments are contemplated for the determination of the angle of the belt relative to the image frame in step 608. Each of the edge lines are, as discussed with respect to step 606, perfect lines or imperfect lines but within an acceptable range of curvature or completeness. It may be the case that each of the two edge lines are not parallel to each other due to out-of-plane image acquisition in step 602. In one embodiment the angle of the belt is determined by the average slope or angle of the two edge line angles. Alternatively, a single edge line may be selected as indicating the angle of the belt. If two or more lines are to be the determinate of the indicia of the angle of the belt, the angle of the belt may be determined by an arithmetic function, such as the mean, mode, or average of the two or more lines. In another alternative, the angle of the belt is determined by one or more of a number of interior lines, such as belt rib lines, and optionally include one or both edge lines.

For many items under test, such as a belt, imaged indicia of the angle of the belt is readily determined by determining the edge lines and optionally a number of rib lines parallel to the edges. Other indicia of the angle of the belt are also contemplated. In another embodiment, step 606 identifies a feature of the belt indicative of orientation and step 608 determines the angle of the belt relative to the frame by utilizing the indicia of orientation. In one embodiment, a non-structural feature is added to the belt, such as a chalk mark, filament, printing or other demarcation. In another embodiment, the feature is structural, such as ribs or teeth. If the imaged feature is known to be non-parallel to the edge of the belt, step 608 considers the known angle of the feature when determining the angle of the belt relative to the image frame. To illustrate the embodiment, a belt with teeth, whereby peaks and valleys of the teeth are at a 90 degree angle to the belt are considered. In this embodiment, step 606 identifies a number of teeth and step 608 determines the angle of the belt as being 90 degrees from the angle delineating the teeth.

The frame of an acquired image known to be the perimeter of the image, or relevant portion of an image, as represented in human or computer readable form. In common imaging systems known in the art, a charged coupled device (CCD), or similar imaging array, is utilized to capture images. These imaging arrays comprise an array of light sensitive pixels commonly arranged in a rectangular array format. Individual pixels may be sensitive to a single color, such as red, blue and green, black and white, or grayscale. For purposes herein, we need not consider a first single-color pixel as a different pixel from those pixels capturing a different color of the same image. As is known with rectangles, rectangular imaging arrays have a long and short dimension or axis. The more ideal image of a belt to be analyzed is an image whereby the belt runs the length of the longest axis of the frame and is within the frame with respect to the width of the belt, such that both edges are captured, and parallel with the longest axis of the frame of the image.

It will be generally preferred to utilize the longest axis of the frame as the preferred axis. However, in other embodiment, the angle of the frame is determined with respect to a preferred orientation of the frame which may, or may not, coincide with the long dimension of the array. In embodiments employing an image capture device 1204 with a square imaging array, the more ideal image of the belt may be parallel to either of the perpendicular axis of the frame. One axis, such as the axis closest to parallel with the image of the belt, may be selected. However, analysis module 1208 may require or otherwise prefer a particular orientation (e.g., vertically) and the preferred axis selected in accord with such a requirement or preference. Similarly, image capture device 1204 with a circular or irregular frame may have a preferred axis selected solely in accord with the requirements or preference of the analysis module 1208 or in accord with an axis otherwise previously determined.

Figure 7:
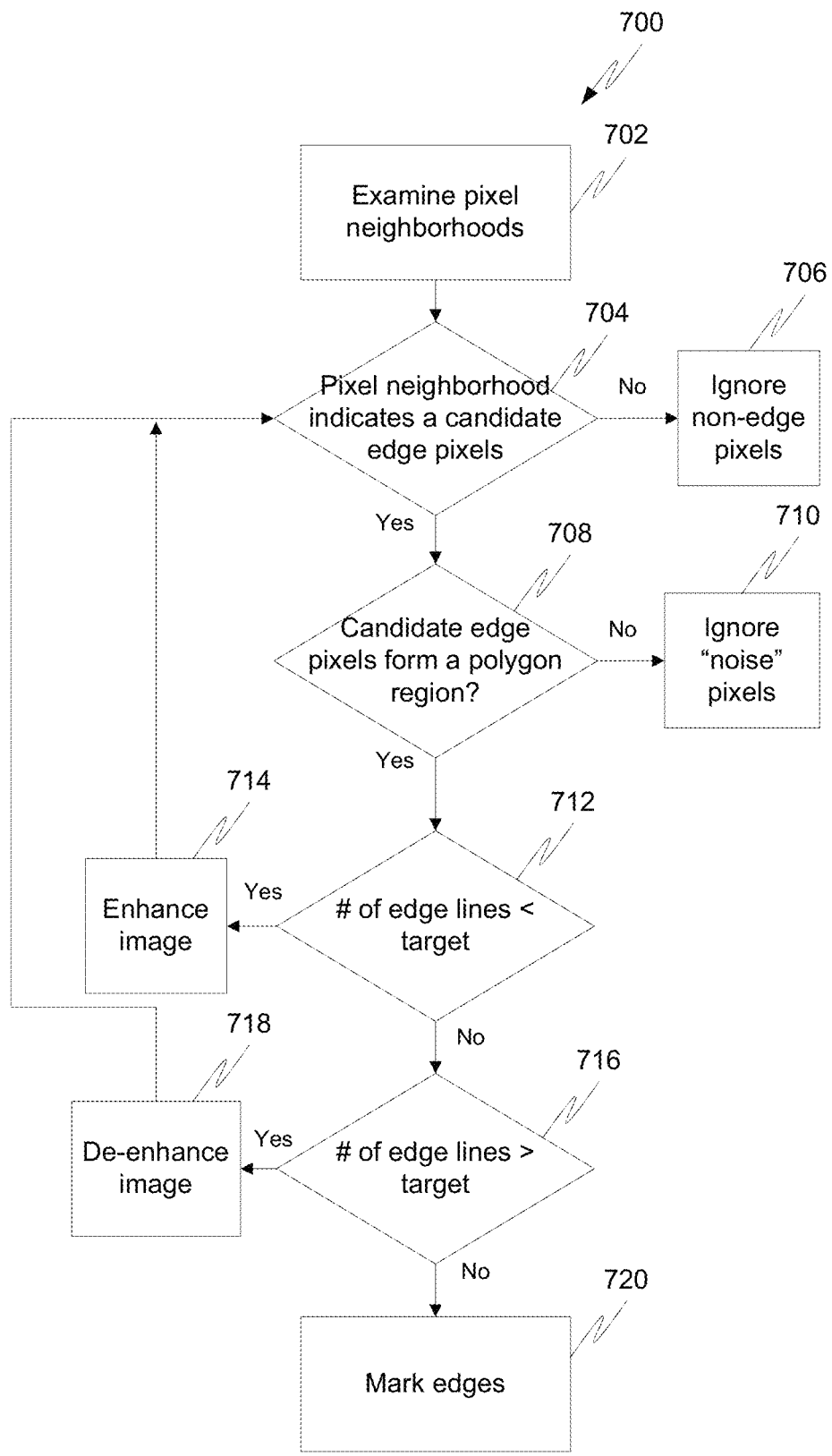
FIG. 7 is a flowchart illustrating a method of edge detection in accordance with embodiments of the present disclosure.

With regard to FIG. 7, flowchart 700 is provided illustrating one embodiment of sub-steps comprising edge detection step 608. Pixel neighborhoods are examined in step 702. Step 704 determines if an edge is indicated for the candidate pixel. In one simplified embodiment, a candidate pixel is considered within a neighborhood of 8 adjacent pixels, that is to say, a 3×3 pixel array with the candidate pixel in the center. In one example, step 704 would consider the pixel to be an edge candidate pixel upon determining all six of the pixels in the top two rows, which includes the candidate pixel, had one common attribute that was not shared from the three pixels in the bottom row. Should the neighboring pixels be less readily delineated, such as all pixel are identical or nearly identical to the candidate pixel or the neighborhood has no readily identified attribute to delineate an edge, the pixels may be considered non-edge pixels in step 706.

Certain error detection operations may also be incorporated. In one embodiment, the number of edge pixels may be outside of an expected range. To illustrate one embodiment by way of example; a captured image of a belt is expected to have two sets of edge pixels corresponding the edge of the belt. A perfect line captured by an imaging array and running parallel to the preferred axis and terminating at the boundary of the frame, would include a number of pixels equivalent to the length of the preferred axis of the frame multiplied by the width of the line. Images of real world objects, even substantially linear ones such as a belt, are unlikely to form lines with such an exact dimension, however, a range can be expected. In one implementation, the number of edge pixels candidates equals zero and may trigger an error condition or steps to enhance the image.

Once a candidate edge pixel has been identified, step 708 determines if a number of the candidate edge pixels form a polygon region. An image with a significant number of edge candidate pixels that do not form a polygon region, may form another geometry or a more random pattern. This may be an indication of a poor quality image. In other cases, a certain number of edge candidate pixels that do not form polygon region may simply indicate other features ("noise") and be excluded from further consideration as an edge candidate. As described with regard to edge pixels, if the number of expected edge lines falls outside of an expected range, processing may continue with step 712 or an error condition may be generated.

Step 712 determines if the number of lines formed are less than a target number of lines. In one embodiment, edges of a belt are being detected and, therefore, two lines are the expected number of target lines. In another embodiment, a number of belt ribs are expected and, therefore, two lines and the number of rib lines determine the expected number of target lines.

Step 712 determines if the number of edge lines are below the target number of lines. In one embodiment, the user is notified of an error condition. In another embodiment, processing continues to step 712 whereby the image is enhanced to bring out more detail. Enhancement step 714 may include decreasing contrast, increasing resolution, or other image enhancing technique. Processing may then resume at step 704 with the enhanced image.

Step 716 determines if the number of edge lines are above the target number of lines. In some embodiments, additional lines are not a determent to further processing and, in such embodiments, step 716 may be omitted and processing continues directly to step 720. In embodiments where too many target lines are detected and correction is required, step 718 may de-enhance the image to reduce the detail and, preferably, result in fewer lines. De-enhancement step 718 may include increasing contrast, decreasing resolution or other image de-enhancing technique. Processing may then resume at step 704 with the de-enhanced image.

In certain embodiments, steps 718 and 714 are combined into an image alteration or enhancement step. A parameter, such as the increased or decreased image attribute value is selected and applied to either reveal more detail or diminish detail. Techniques for image alteration include, but are not limited to, changing the resolution, contrast, brightness, gamma, sharpness, or one or more color values.

Step 720 marks the location of the edges. Various embodiments of marking are contemplated herein. In one embodiment, the image is marked with the addition of a line, such as a line with a color known to the analysis module 1208, a display or other module, as being associated with the location of an edge. In another embodiment, the image is encoded with the location of the edge lines in a format decodable by analysis module 1208. Such encoding may be placed in the image metadata or in one or more pixels. In yet another embodiment, the location of the edges is associated with an image and the edge locations transmitted or otherwise provided to analysis module 1208.

Flowchart 700 may be implemented to detect a number of ribs on a belt, whereby step 704 determines the edge of a number of ribs and step 708 determines if the rib edges form a line. The detection of the edge of a rib may be performed by detecting the top of a rib, the valley between ribs, the apex of a triangular or curved rib or rib valley or other visual cue delineating a rib. It should be appreciated that various steps illustrated in flowcharts 600 and 700 may be omitted or reordered without departing from the invention described herein. In one embodiment of a modification to flowchart 700, step 704 identifies candidate edge pixels and processing continues directly to step 720 to marks the candidate edge pixels as edges.

Figure 8:
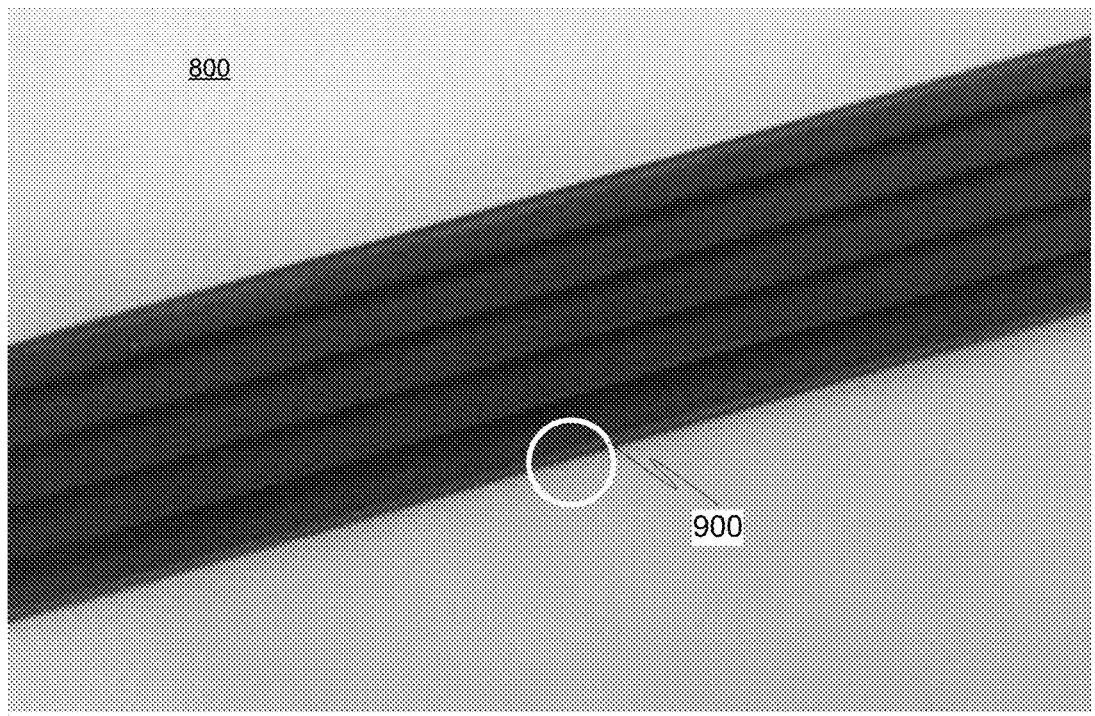
FIG. 8 is a first belt image in accordance with embodiments of the present disclosure.

FIG. 8 is an embodiment of a first belt image 800 captured by image capture device 1204. Image portion 900 is further described with respect to FIG. 9.

Figure 9:
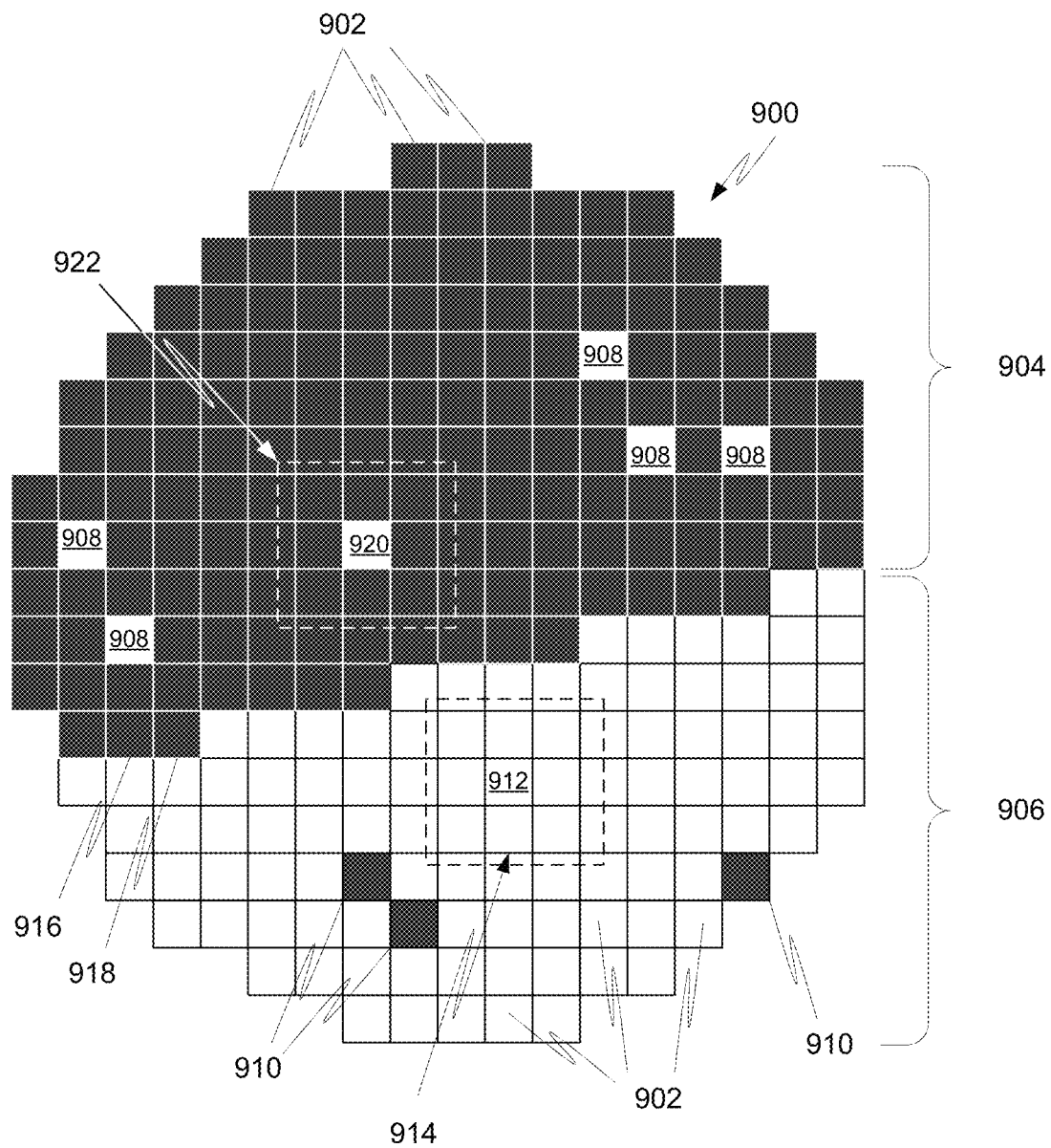
FIG. 9 illustrates a binary image of a portion of the first belt image in accordance with embodiments of the present disclosure.

FIG. 9 illustrates a binary image portion 900 of the first belt image 800. Binary image portion 900 illustrates a portion of first belt image 800 after the application of image alteration processes, such as contrast enhancement. Image portion 900, illustrates a number of pixels 902. Pixels 902 are illustrated to indicate which value associated with a binary attribute, such as black and white, is associated with ones of pixels 902. Other values (e.g., luminosity, color threshold) may also be used such as when black pixels 904 represent pixels with a red value above a threshold and white pixels 906 represent pixels with a red value below a threshold.

As a simplified example of the embodiment, binary image portion 900 has black pixels 904 of belt portions of the image and while pixels 906 are extraneous (e.g., background) portions of the image. Images may include artifacts not representing the desired image. Here, white pixels 906 include black pixel artifacts 910 and black pixels 904 include while pixel artifacts 908. The embodiments provided herein allow the artifacts to be excluded from edge detection processing.

Determination of a pixel neighborhood, as described with respect to FIG. 3, allow artifact pixels 908 and 910 to be excluded as edge candidate pixels. Pixel 912 is of one attribute (e.g., white) and 3×3 pixel neighborhood 914 contains pixel which are all of a common attribute and therefore can be excluded as an edge candidate pixel. Pixel 920 is unique in 3×3 grid of pixel neighbors 522 and may also be excluded as an edge candidate.

Pixel 916, with five contiguous neighboring black pixels and three contiguous white pixels may be considered an edge candidate. Pixel 918 is illustrated with four neighboring white and four neighboring black pixels, and may also be considered an edge candidate. More complex examples illustrating the embodiments whereby a pixel is determined to be, or not be, and edge pixel candidate are also considered. One or more iteration whereby the threshold of a pixel attribute is changed or the size or configuration of the pixel neighborhood is modified may also be used to determine edge pixels. Once the edge pixels are determined, their location is made available for further processing.

Figure 10:
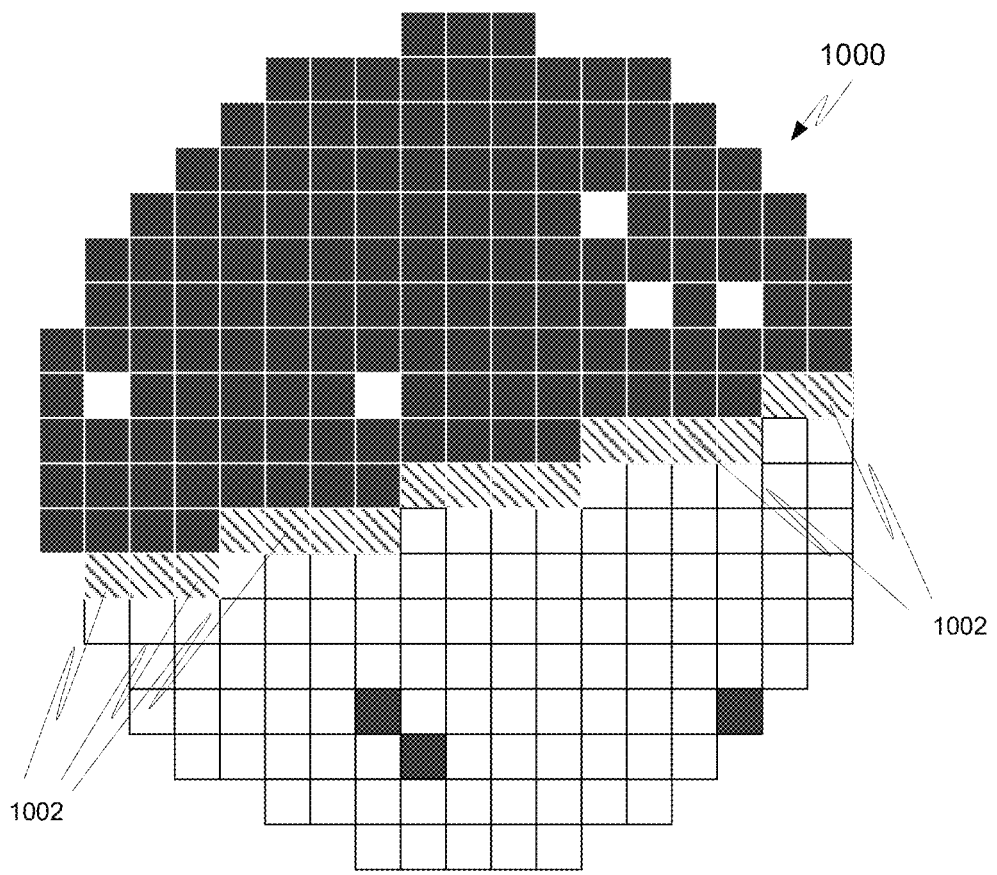
FIG. 10 illustrates the application of an edge demarcation line in accordance with embodiments of the present disclosure.

FIG. 10 illustrates an embodiment of an application of an edge demarcation line 1002. In one embodiment, image portion 1000 is modified or a modified copy of image portion 900. Edge pixels 1002 have been identified and enhanced (represented in the figure by crosshatching). Enhancement may be embodied by the application of a specific color, luminosity or other identifiable pixel attribute. Edge pixels 1002 are enhanced to facilitate identification of the belt edge by a human or computer user of image portion 1000. In other embodiments, the edge locations are recorded in a form and location usable by analysis module 1208. Enhancement to edge pixels 1002 may be applied to a modified image, such as binary image portion 900 representing a processed version of first belt image 800 or a native image, such as first belt image 1600.

Figure 11:
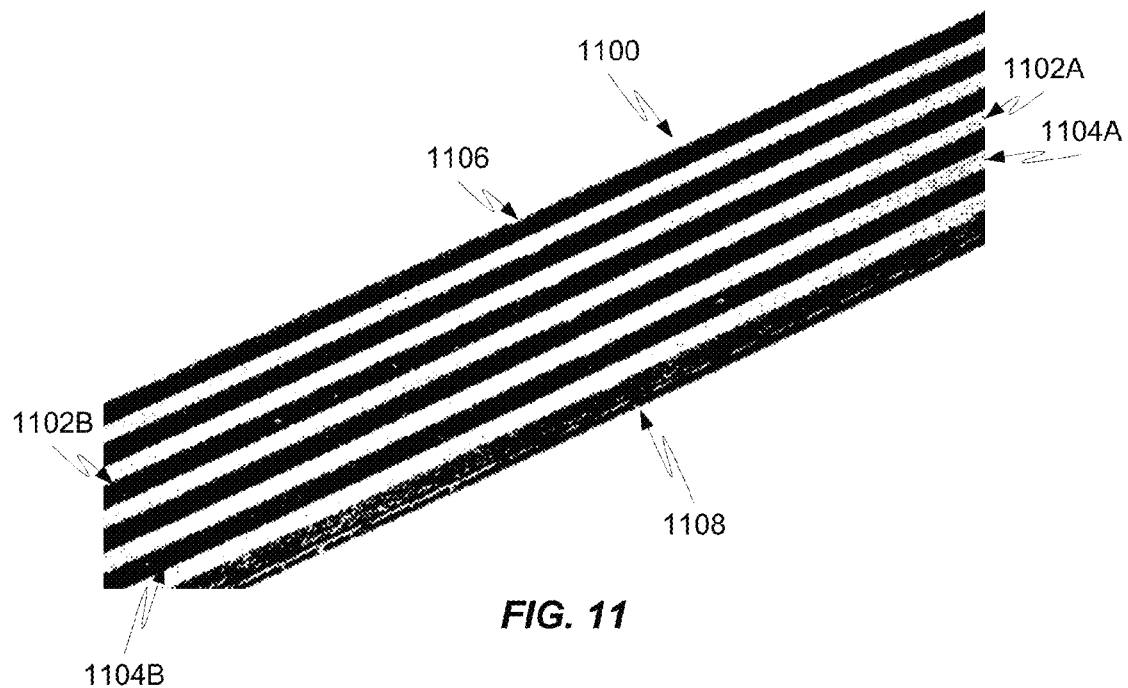
FIG. 11 illustrates a rotated image of the first belt image with enhanced contrast to facilitate the identification of a number of ribs in accordance with embodiments of the present disclosure.

FIG. 11 illustrates an embodiment of an enhanced image 1100 of first belt image 800. Enhanced image 1100 reveals, first and second edges 1106 and 1108 and a number of dark areas 1100B and 1104B and a number of light areas 1100A and 1104A, corresponding to a number of ribs. For clarity, additional ribs beyond 1100 and 1104 have not been identified. In one embodiment, the boundary of dark areas 1100B and 1104B with white areas 1100A and 1104A are rib lines and are determined to be indicia of the angle of belt 1100 within the frame of FIG. 11. In another embodiment, at least one of edge 1106 and 1108 are indicia of the angle of belt 1100 to the frame of FIG. 11. The indicia being determined by a process, such as that illustrated by FIG. 7.

Figure 12:
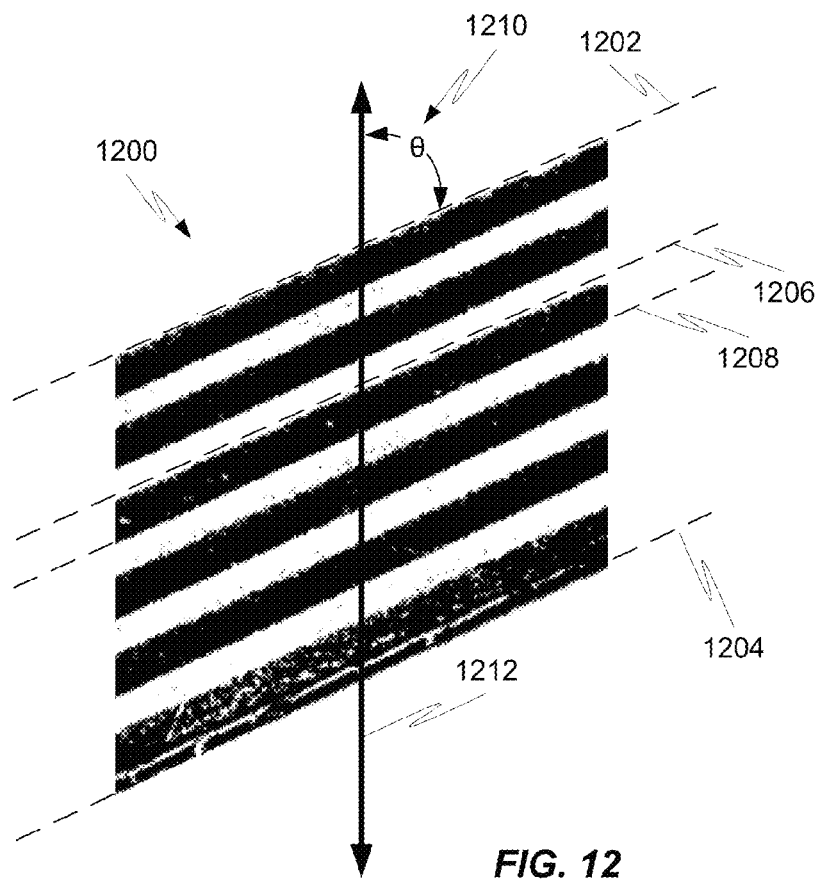
FIG. 12 illustrates a portion of the first belt image with rib lines, edge lines and a preferred axis in accordance with embodiments of the present disclosure.

FIG. 12 illustrates a portion of the first belt image 1200, such as a segment of image 1100. Rib lines 1206 and 1208, edge lines 1202 and 1204, and preferred axis 1212 are illustrated in accordance with embodiments of the present disclosure. Edge lines 1202 and 1204 and rib lines 1206 and 1208 are determined, such as by execution of the steps of flowcharts 1300, 600, and/or 700, which may be performed by imaging system 1200.

As discussed in more detail, with respect to FIG. 6, an image may have a preferred axis. The preferred axis may correspond to the longest axis of a rectangular imaging array, an axis associated with a preferred orientation of the image by image analysis module 1208 or other preferred axis by which an advantage may be obtained. Rib lines 1206 and 1208 are interior to edge lines 1202 and 1204. For clarity additional rib lines are not illustrated in the figure.

In the illustrated embodiment, preferred axis 1212 is at angle θ (theta) to edge line 1202. Due to out-of-plane imaging lines, such as edge lines 1202 and 1204 and rib lines 1206 and 1208 may not be parallel. In such embodiments, theta may be the angle formed by the preferred axis 1212 and any one or more of edge line 1204, rib lines 1206 and 1208, additional rib lines (not illustrated), or the average, mean, mode, best-fit or other function operable to produce an indication of the orientation of the portion of the first belt image 1200 from two or more potential indicators.

Figure 13:
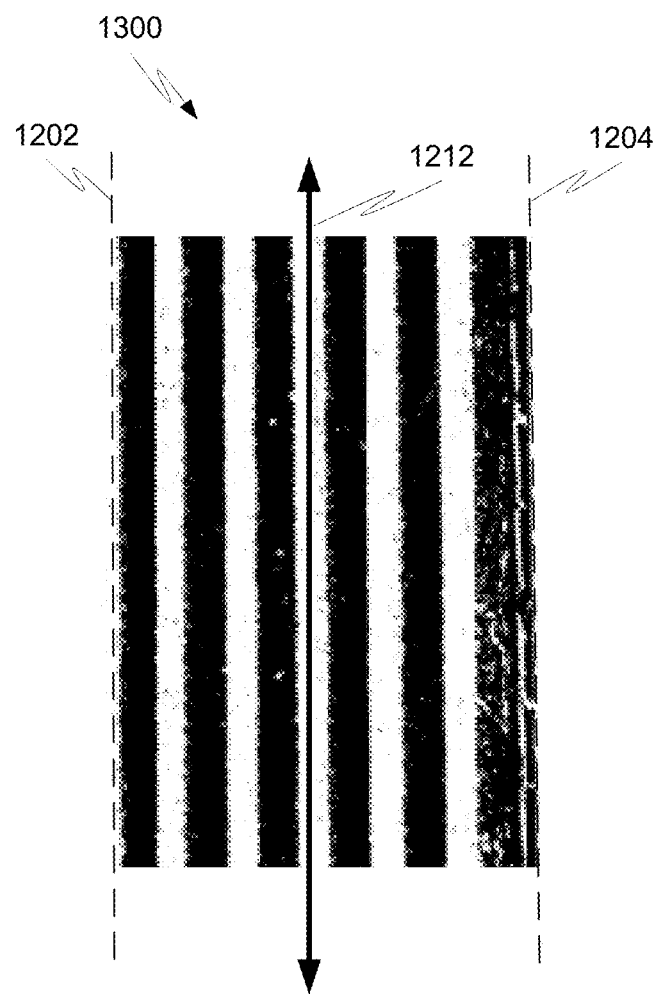
FIG. 13 illustrates a processed belt image in accordance with embodiments of the present disclosure.

FIG. 13 can be precluded or included in the analysis where FIG. 13 illustrates a processed belt image 1300 in accordance with embodiments of the present disclosure. In one embodiment, edge line 1202 was selected as the determining line and image 1300 rotated into a position such that the angle theta formed by preferred axis 1212 and edge line 1202 is zero. As discussed with respect to other embodiments, alternate lines or mathematical operations of more than one line may be used to determine the orientation of belt relative to preferred axis 1212 and, after processing, becoming parallel to preferred axis 1212

In additional embodiments, creating processed belt image 1300 facilitates measuring of features of processed belt image 1300. An additional factor may be required to be known to convert distance on an image (e.g., distance between two or more pixels as measured in pixels) to distances associated with the object under test 1202 (e.g., width of a belt, missing portions due to wear or damage). The additional factor may include the known width or other dimension of the belt or belt feature, the acquisition of first belt image 800 occurring with imaging device 1204 being a known distance from object under test 1202, known imaging properties of image-capture device 1204 (e.g., a narrow and known plane of focus), or imaging of an object not under with a known dimension at substantially the same distance from image-capture device 1204 as object under test 1202. With the benefit of knowing belt dimensions, belt analysis module 1208 may utilize such information to determine the condition of the belt or other analysis operation.

Figure 14:
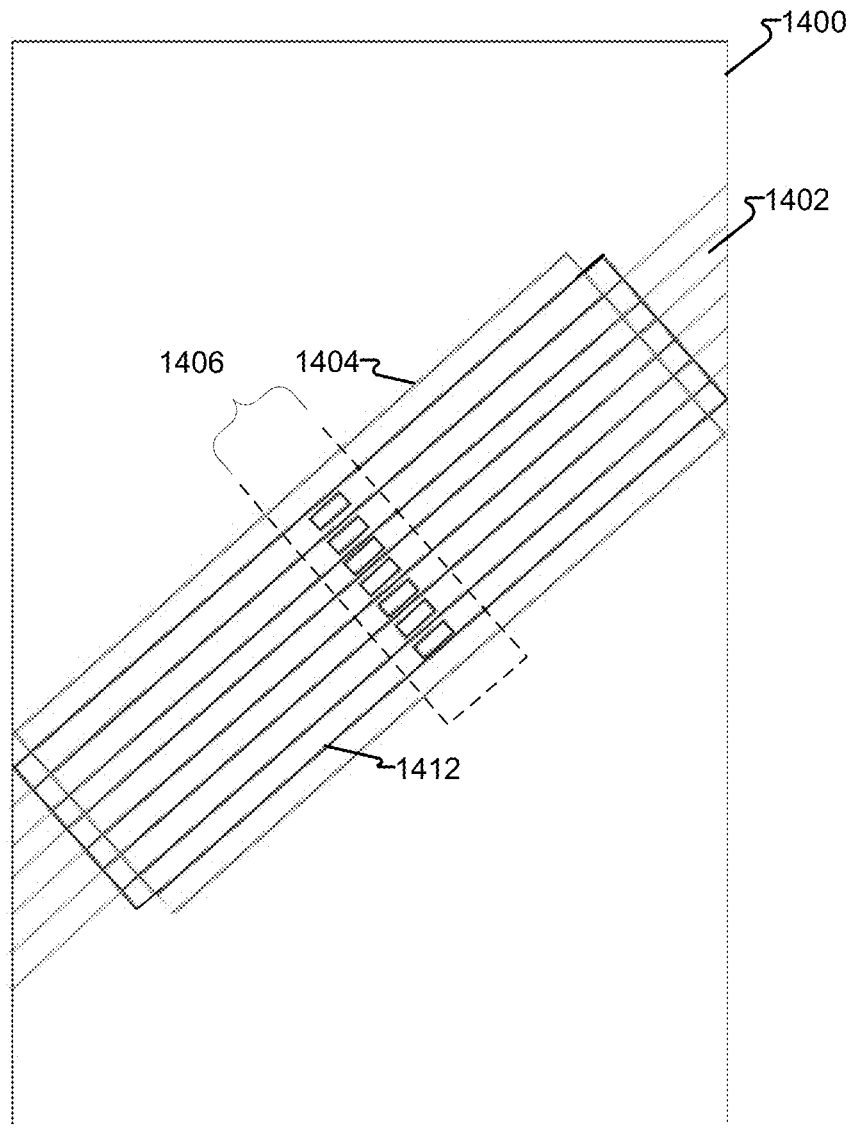
FIG. 14 illustrates a belt image and crop buffer in accordance with embodiments of the present disclosure.

FIG. 14 illustrates belt image 1400 and crop buffer 1412 in accordance with embodiments of the present disclosure. In one embodiment, belt 1402 lies at a non-zero, non-perpendicular angle within belt image 1400. Buffer 1404 captures an image of belt 1402 bounded by the edge of belt 1402 to the edge of frame of image 1400. Operational conditions and environmental factors may prohibit buffer 1404 from capturing the true and complete edge of belt 1402. As a result, processing rotated buffer 1404 may be subject to a higher error rate due to image information being omitted.

In another embodiment, crop buffer 1412 is bounded by the belt with an extended buffer of the width of belt 1402. The amount of crop buffer 1412 extends beyond buffer 1404 may vary in accord with the degree of certainty for which the edge of belt 1402 may be accurately captured. For example, environmental factors (e.g., lighting, belt scarring, etc.), image properties (e.g., contrast, degree of belt rotation, etc.), and/or user selection may determine the extent of crop buffer 1412 beyond buffer 1404. In one embodiment, crop buffer 1412 is approximately 10% larger than buffer 1404.

In one embodiment, crop buffer 1412 may be shorter along the length of belt 1402 such that crop buffer 1412 may remain within the frame of belt image 1400.

Figure 15:
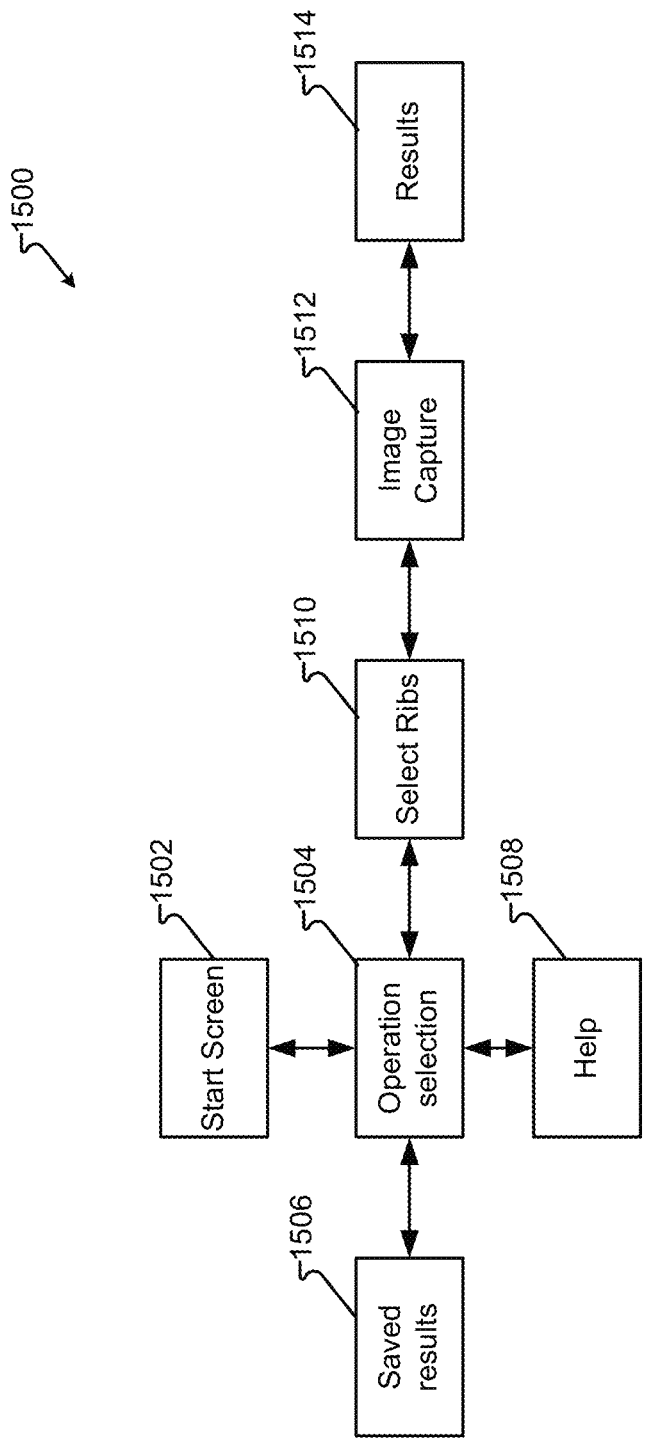
FIG. 15 illustrates a process flow in accordance with embodiments of the present disclosure.

FIG. 15 illustrates process flow 1500 in accordance with embodiments of the present disclosure. In one embodiment, process flow 1500 includes a number of operation steps 1502, 1504, 1508, 1510, 1512, and 1514. In other embodiments, more, fewer, or a reordered number of steps may be implemented such that a user may capture a belt image for analysis and view the results of the analysis.

In one embodiment, a user starts at start screen step 1502 and proceeds to operation selection step 1504. Operation selection step 1504 may proceed to saved results step 1506, help step 1508, and select ribs step 1510. Select ribs step 1510 may then proceed to image capture step 1512 and results step 1514, whereby the user is presented with results of the analysis of a belt image. A user may be able to return to a previous process step.

In one embodiment, process flow 1500 is an application and starts with start screen step 1502 displaying initial information on the application. Operation selection step 1504 displays options for selection. One option is saved results step 1506, whereby prior image captures (see step 1512) and/or results (see step 1514) may be retrieved for display. Help step 1508 provides instructions, tutorials, examples, or other assistance to a user operating an application using process flow 1500.

Select ribs step 1510 displays an interactive presentation whereby the number of ribs for a belt to be analyzed is input but the user. The user may then proceed to image capture step 1512 whereby a prior image may be selected or an image captured via a built-in camera or a camera accessible to a device performing process flow 1500 or otherwise operable to capture an image of a subject belt.

With a belt image captured in image capture step 1512, the belt may be analyzed according to at least some of the embodiments described herein, and presented in results step 1514. In a further embodiment, image capture step 1512, once an image has been selected or acquired, may display the progress of the analysis prior to presenting results step 1514

Figure 16A:
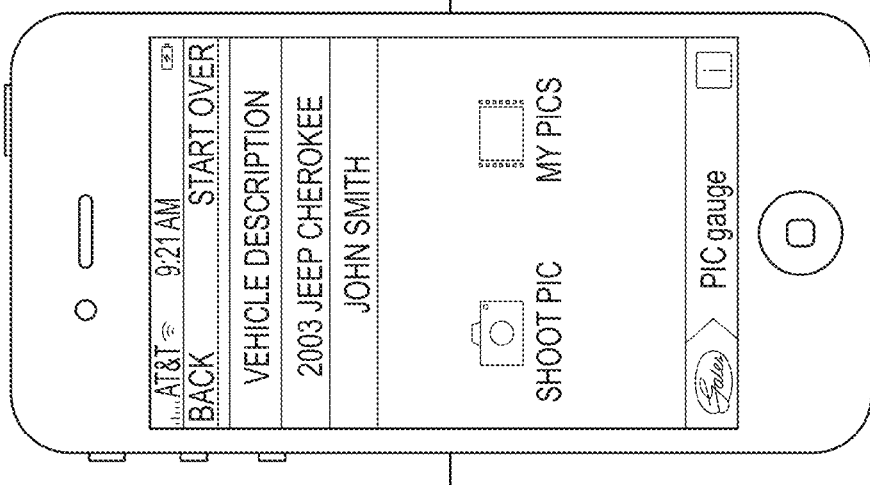
Figure 16A:
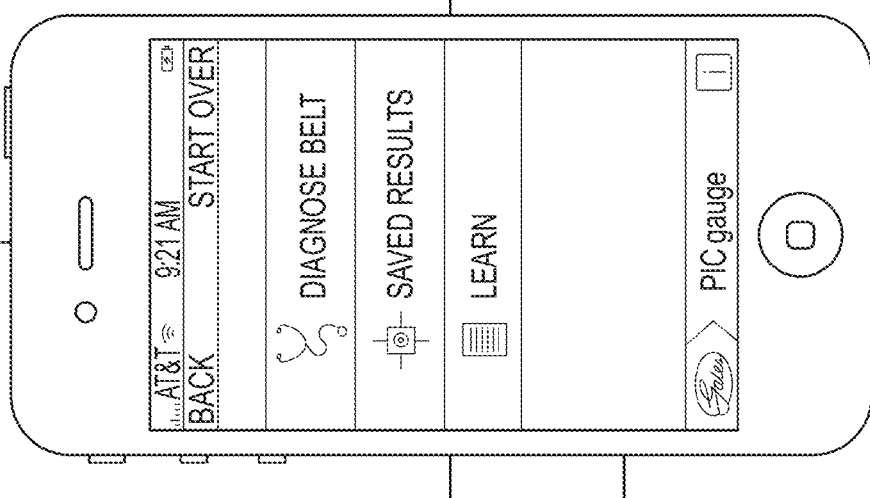
Figure 16A:
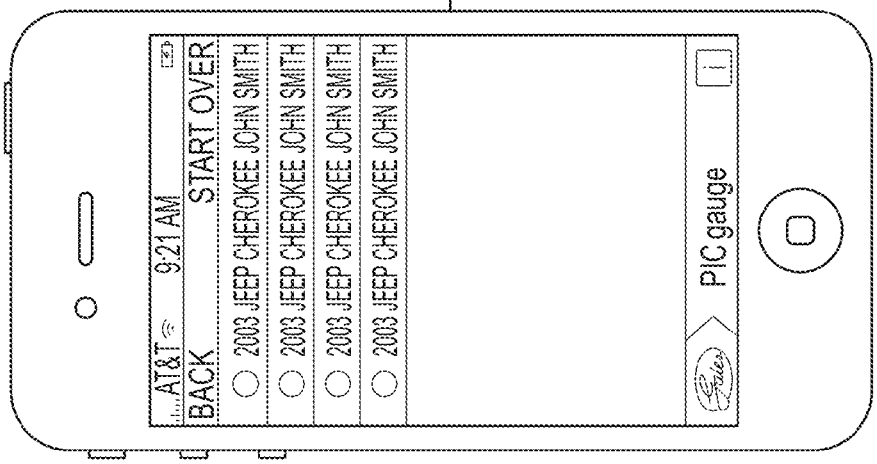
Figure 16C:
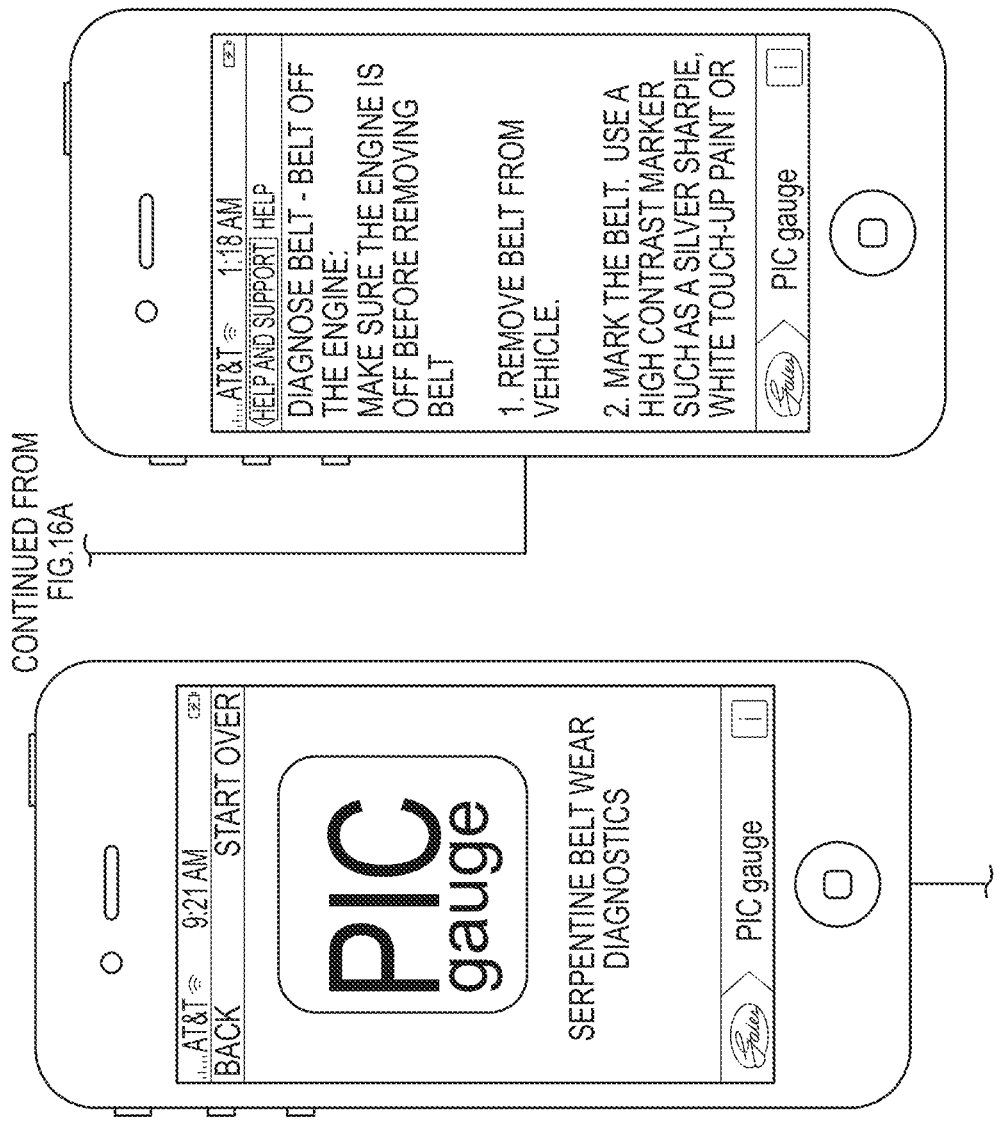
Figure 16D:
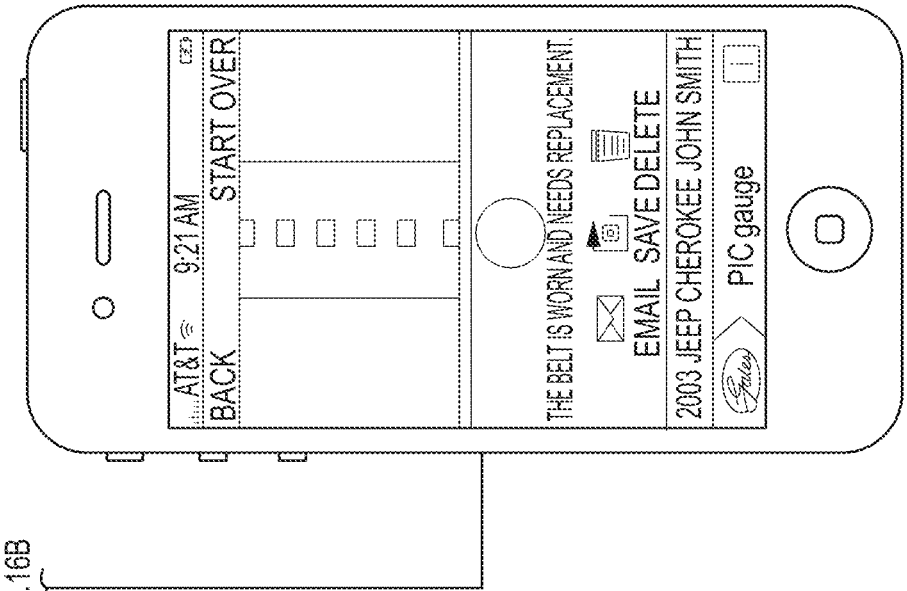
Figure 16D:
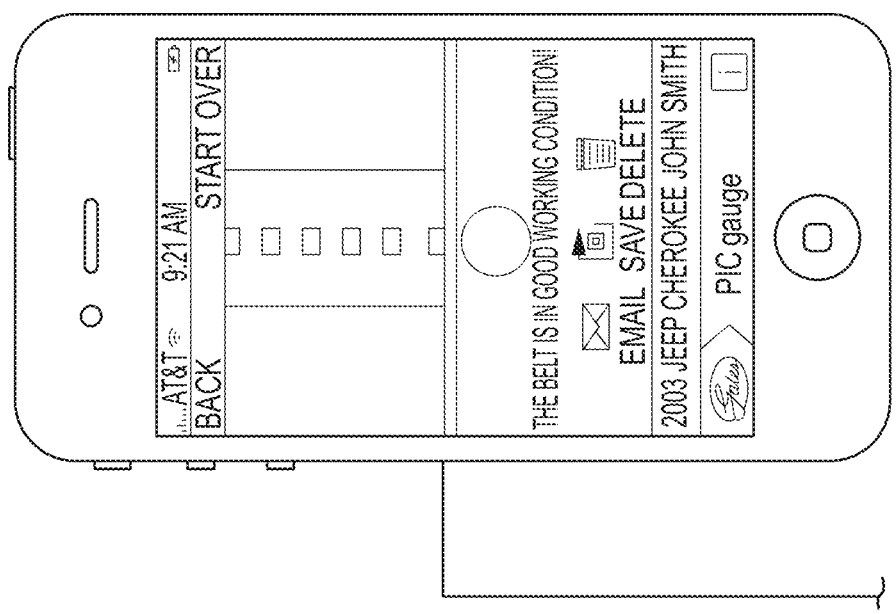

FIGS. 16A-16C illustrate process flow 1600 as presented to a user in accordance with embodiments of the present disclosure. In one embodiment, process flow 1600 is a visual presentation of a single device executing process flow 1500 and presenting a display in accord with steps of process flow 1500. The device may be a cellular telephone application, personal data assistant (PDA), tablet computer, laptop computer, desktop computer with an attached camera, or other device operable to perform the steps of process flow 1500.

In one embodiment, display 1602 is presented to a user in accord with step 1502, display 1604 is presented to a user in accord with step 1504, display 1606 is presented to a user in accord with step 1506, display 1608 is presented to a user in accord with step 1508, display 1610 is presented to a user in accord with step 1510, and display 1612 is presented to a user in accord with step 1512. In another embodiment, one of displays 1614 is presented to a user in accord with step 1514. Display 1612, may include a captured image, a live image and receive a user input to capture the live image (e.g., by touching image 1616), or an option to retrieve an image. Display 1612 may also include progress bar 1618, text, and/or other indicator as to the progress of the analysis of the image.

In one embodiment, the analysis may determine the belt is in one of three conditions (e.g., good, fair, bad; 1, 2, 3; etc.) and select one of displays 1614A, 1614B, and 1614C for display to the user accordingly. In a first further embodiment, display 1614A is presented to a user in accord with step 1514 upon the analysis indicating the subject belt is in good condition and may further indicate the belt may remain in service. In a second further embodiment, display 1614B is presented to a user in accord with step 1514 upon the analysis indicating the subject belt is in fair condition and may further indicate the belt is nearing the end of its service life. In a third further embodiment, display 1614C is presented to a user in accord with step 1514 upon the analysis indicating the subject belt is in poor condition and may further indicate the belt is in need of replacement.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method of processing an image of an object under test to be analyzed, the method comprising:
   acquiring an image of the object under test, the image having a frame with a preferred axis and comprising a number of pixels;
   identifying, by a processor, an indicia of the angle of the object under test within the image relative to the preferred axis, comprising:
      determining a number of edge pixels forming a number of sets of the edge pixels, the number of edge pixels being determined from a number of pixels of the image;
      determining a number of indicia candidate regions, each candidate region forming a polygon bounded by at least one of the number of sets of the edge pixels; and
      determining the indicia from at least two of the number of indicia candidate regions; and
   determining the angle between the preferred axis and the indicia;
   rotating the image by the negative value of the angle;
   performing the analysis on the object under test without rotating the image; and
   presenting a result of the analysis on a user device.

2. The method of claim 1, wherein determining the indicia, further comprises determining the indicia from at least one of an average, mean, and mode of the number of indicia candidate regions.

3. The method of claim 1, wherein determining the indicia from the at least one of the number of indicia candidate regions, further comprises determining the indicia from the number of indicia candidate regions indicating at least one edge of the object under test.

4. The method of claim 1, further comprising:
   upon determining, at least one of, the quantity of the number of edge pixels is outside of a previously determined first range and the quantity of the determined number of indicia candidate regions is out of a previously determined second range;
   altering the image to improve the quantity of the number of edge pixels, when the quantity of the number of edge pixels is outside of the previously determined first range, and improve the quantity of edge candidates, when the quantity of the number of indicia candidate regions is out of a previously determined second range; and
   determining which, of the number of pixels of the altered image, are the number of edge pixels.

5. The method of claim 4, wherein altering the image comprises altering the image by changing at least one of resolution, contrast, brightness, at least one color value, gamma, or sharpness.

6. The method of claim 4:
   wherein the step of acquiring an image comprises acquiring an image at a first resolution; and
   wherein altering the image comprises altering the image by changing the resolution to substantially negate the first resolution.

7. The method of claim 1, wherein determining which, of the number of pixels, are the number of edge pixels, further comprises, performing a pixel neighborhood analysis on the number of pixels to identify the number of edge pixels.

8. The method of claim 1, wherein the object under test is a belt.

9. The method of claim 1, wherein at least one of the number of sets of edge pixels comprises a delineation of a rib of a belt.

10. An image-based evaluation system, comprising:
    an image processor, configured to create a more optimal image from a captured image of an object under test by rotating an image of the object under test to substantially align a preferred axis of image of the object under test to align with a preferred axis of the image wherein the angle of rotation is determined by the processor determining a number of edge pixels forming a number of sets of the edge pixels, the number of edge pixels being determined from a number of pixels of the image, determining a number of indicia candidate regions, each candidate region forming a polygon bounded by at least one of the number of sets of the edge pixels, and determining the indicia from at least two of the number of indicia candidate regions;
    an analysis module, configured to evaluate the more optimal image and output the results of the evaluation; and
    a storage medium, configured to store the more optimal image.

11. The system of claim 10, further comprising, an image-capture device configured to capture the image of the object under test.

12. The system of claim 10, further comprising a user interface configured to receive input commands to the system from a human user, display the more optimal image, and provide the input commands to the image processor.

13. The system of claim 12, whereby the image processor further comprises:
    an image rotation detection processor, configured to determine the angle of the object under test to a frame of the captured image; and an image rotation processor, configured to rotate the captured image by the negative value of the determined angle of the object under test for display as the more optimal image.

14. The system of claim 13, whereby the image rotation detection processor further comprises identifying an indicia of the angle of the object under test to a preferred axis of the frame of the captured image.

15. The system of claim 10, further comprising, an image enhancement processor, configured to increase the perceived detail of the object under test in the image.

16. The system of claim 10, wherein the image analysis module, is further configured to analyze the object under test from the captured image to determine the remaining service life for the object under test.

17. A non-transitory computer-readable medium storing a program that, when executed, causes a computing device to execute the process comprising:
  acquiring an image of an object under test;
  identifying an indicia of the angle of the object under test relative to a preferred axis of the image by determining a number of edge pixels forming a number of sets of the edge pixels, the number of edge pixels being determined from a number of pixels of the image, determining a number of indicia candidate regions, each candidate region forming a polygon bounded by at least one of the number of sets of the edge pixels, and determining the indicia from at least two of the number of indicia candidate regions;
  determining the angle between the preferred axis and the indicia;
  rotating the image by the negative value of the angle;
  analyzing the image of the object under test; and
  saving the rotated image.

18. The non-transitory computer-readable medium of claim 17, whereby identifying an indicia, further comprises:
  identifying pixel neighborhoods that indicate a number of edge pixels;
  identifying a number of candidate lines from a number of sets of the number of edge pixels; and
  identifying the indicia from at least one of the number of indicia candidate lines.

19. The non-transitory computer-readable medium of claim 17, whereby the identifying the indicia further comprises, identifying a first and second edge of the object under test.

20. The non-transitory computer-readable medium of claim 19, further comprising cropping the rotated image to substantially exclude portions of the image not between the first and second edge.

21. The non-transitory computer-readable medium of claim 19, further comprising cropping the rotated image to include a crop buffer beyond the first and second edge.

22. The non-transitory computer-readable medium of claim 21, wherein the crop buffer is substantially ten percent larger than the cropped rotated image.

* * * * *